United States Patent
Lodhi et al.

(10) Patent No.: US 12,488,511 B2
(45) Date of Patent: Dec. 2, 2025

(54) APPARATUS AND METHOD FOR POINT CLOUD PROCESSING

(71) Applicant: InterDigital Patent Holdings, Inc., Wilmington, DE (US)

(72) Inventors: Muhammad Asad Lodhi, Highland Park, NJ (US); Jiahao Pang, Plainsboro, NJ (US); Dong Tian, Boxborough, MA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 130 days.

(21) Appl. No.: 18/271,738

(22) PCT Filed: Jan. 10, 2022

(86) PCT No.: PCT/US2022/011764
§ 371 (c)(1),
(2) Date: Jul. 11, 2023

(87) PCT Pub. No.: WO2022/150680
PCT Pub. Date: Jul. 14, 2022

(65) Prior Publication Data
US 2024/0078715 A1    Mar. 7, 2024

Related U.S. Application Data

(60) Provisional application No. 63/135,775, filed on Jan. 11, 2021.

(51) Int. Cl.
*G06T 9/40* (2006.01)
(52) U.S. Cl.
CPC .................................... *G06T 9/40* (2013.01)

(58) Field of Classification Search
CPC ........ G06T 9/40; H04N 19/13; H04N 19/597; H04N 19/91; H04N 19/119; H04N 19/136; H04N 19/184; G06N 3/08
See application file for complete search history.

(56) References Cited

U.S. PATENT DOCUMENTS

2014/0210652 A1* 7/2014 Bartnik .................. H03M 7/40
341/67
2018/0174275 A1* 6/2018 Bourdev .......... G06V 30/19147
(Continued)

FOREIGN PATENT DOCUMENTS

EP        3514966 A1    7/2019
WO    WO 2021002730 A1    1/2021

OTHER PUBLICATIONS

Chen et al., "BSP-Net: Generating Compact Meshes via Binary Space Partitioning", Institute of Electrical and Electronics Engineers (IEEE), 2020 IEEE/CVF Conference on Computer Vision and Pattern Recognition (CVPR), Seattle, Washington USA, Jun. 13, 2020, 10 pages.

(Continued)

*Primary Examiner* — Ming Wu
(74) *Attorney, Agent, or Firm* — Condo Roccia Koptiw LLP

(57) ABSTRACT

A method, apparatus or system for processing point cloud information can involve a learned deep entropy model over octrees for lossless compression/decompression of 3D point cloud data, wherein self-supervised compression/decompression involves an adaptive entropy coder operating on a tree-structured conditional entropy model and utilizing information from the local neighborhood as well as the global topology from the tree structure.

20 Claims, 13 Drawing Sheets

(56) References Cited

U.S. PATENT DOCUMENTS

| | | | |
|---|---|---|---|
| 2018/0367818 A1* | 12/2018 | Liu | H04N 19/124 |
| 2019/0068995 A1* | 2/2019 | Chono | H04N 19/70 |
| 2019/0182508 A1* | 6/2019 | Zhao | H04N 19/132 |
| 2019/0306538 A1* | 10/2019 | Karczewicz | H04N 19/91 |
| 2019/0378271 A1* | 12/2019 | Takeshima | G16H 30/20 |
| 2020/0221139 A1 | 7/2020 | Vosoughi et al. | |

OTHER PUBLICATIONS

Quach et al., "Improved Deep Point Cloud Geometry Compression", Institute of Electrical and Electronics Engineers (IEEE), 2020 IEEE 22nd International Workshop on Multimedia Signal Processing (MMSP), Tampere, Finland, Sep. 21, 2020, 6 pages.

Tulsiani et al., "Learning Shape Abstractions by Assembling Volumetric Primitives", Institute of Electrical and Electronics Engineering (IEEE), 2017 IEEE Conference on Computer Vision and Pattern Recognition (CVPR), Nov. 9, 2017, Honolulu, Hawaii USA, 9 pages.

Meagher, Donald, "Geometric Modeling using Octree Encoding", Computer Graphics and Image Processing, vol. 19, Issue No. 2, Jun. 1982, 19 pages.

Chen et al., "Fast Resampling of Three-Dimensional Point Clouds via Graphs", Institute of Electrical and Electronics Engineering (IEEE), IEEE Transactions on Signal Processing, vol. 66, Issue No. 3, Feb. 1, 2018, 16 pages.

Zou et al., "3D-PRNN: Generating Shape Primitives with Recurrent Neural Networks", Institute of Electrical and Electronics Engineering (IEEE), 2017 IEEE International Conference on Computer Vision (ICCV), Oct. 22, 2017, Venice, Italy, 10 pages.

Li et al., "Supervised Fitting of Geometric Primitives to 3D Point Clouds", Institute of Electrical and Electronics Engineers (IEEE), 2019 IEEE/CVF Conference on Computer Vision and Pattern Recognition (CVPR), Long Beach, California USA, Jun. 15, 2019, 9 pages.

Huang et al., "DeepPrimitive: Image decomposition by layered primitive detection", Computational Visual Media, vol. 4, No. 4, Dec. 2018, 13 pages.

Mammou, et al., "G-PCC codec description v1", International Organization for Standardization, ISO/IEC JTC1/ SC29/WG11, Coding of Moving Pictures and Audio, Document: N18015, Oct. 2018, Macau, China, 31 pages.

Li et al., "Grass: Generative recursive autoencoders for shape structures", ACM Transactions on Graphics (TOG), vol. 36, Issue 4, Article No. 52, Jul. 20, 2017, 14 pages.

Que et al., "VoxelContext-Net: An Octree based Framework for Point Cloud Compression", Cornell University Library, Computer Science, Computer Vision and Pattern Recognition, Document: arXiv:2105.02158v1, May 5, 2021, 10 pages.

Dovrat et al., "Learning to Sample", Institute of Electrical and Electronics Engineering (IEEE), 2019 IEEE/CVF Conference on Computer Vision and Pattern Recognition (CVPR), Long Beach, CA, USA, Jun. 15, 2019, 10 pages.

Anonymous, "Draco 3D Data Compression", Draco Library Home Page; URL: https://google.github.io/draco/, 2017, 2 pages.

Yang et al., "FoldingNet: Point Cloud Auto-Encoder via Deep Grid Deformation", Institute of Electrical and Electronics Engineering (IEEE), 2018 IEEE/CVF Conference on Computer Vision and Pattern Recognition, Salt Lake City, UT, USA, Jun. 18, 2018, 10 pages.

Huang et al., "OctSqueeze: Octree-Structured Entropy Model for LiDAR Compression", Institute of Electrical and Electronics Engineering (IEEE), 2020 IEEE/CVF Conference on Computer Vision and Pattern Recognition (CVPR), Seattle, WA, USA, Jun. 13, 2020, 11 pages.

Eldar et al., "The Farthest Point Strategy for Progressive Image Sampling", Institute of Electrical and Electronics Engineering (IEEE), IEEE Transactions on Image Processing, vol. 6, No. 9, Sep. 1997, 11 pages.

Biswas et al., "MUSCLE: Multi Sweep Compression of LiDAR using Deep Entropy Models", Cornell University Library, Electrical Engineering and Systems Science, Image and Video Processing, Document: arXiv:2011.07590v1, Nov. 15, 2020, 20 pages.

Li et al., "Primitive Fitting using Deep Boundary Aware Geometric Segmentation", Cornell University Library, ARXIV, Computer Science, Computer Vision and Pattern Recognition, Document: arXiv:1810.01604v1, Oct. 3, 2018, 8 pages.

Qi et al., "PointNet: Deep Learning on Point Sets for 3D Classification and Segmentation", Institute of Electrical and Electronics Engineering (IEEE), 2017 IEEE Conference on Computer Vision and Pattern Recognition (CVPR), Honolulu, HI, USA, Jul. 21, 2017, 9 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

ISO/IEC, "Information Technology—Generic Coding of Moving Pictures and Associated Audio", International Organization for Standardization, ISO/IEC JTC1/SC29/WG11, N0702rev, Recommendation H.262, ISO/IEC 13818-2, Mar. 25, 1994, 212 pages.

ISO/IEC, "Information technology—Generic coding of moving pictures and associated audio information: Systems", International Standard ISO/IEC 13818-1:201x—Recommendation ITU-T H.222.0, Oct. 2014, 296 pages.

ITU-T, "Infrastructure of audiovisual services—Coding of moving video—Versatile Video Coding", International Telecommunication Union, ITU-T Telecommunication Standardization Sector of ITU, Series H: Audiovisual and Multimedia Systems, Recommendation ITU-T H.266, Aug. 2020, 516 pages.

\* cited by examiner

APPARATUS AND METHOD FOR POINT CLOUD PROCESSING

CROSS REFERENCE TO RELATED APPLICATIONS

This application is a U.S. National Stage Application under 35 U.S.C. § 371 of International Patent Application No PCT/US2022/011764, filed Jan. 10, 2022, which claims the benefit of U.S. provisional Application No. 63/135,775, filed Jan. 11, 2021, each of which is incorporated herein by reference in its entirety.

TECHNICAL FIELD

The present disclosure involves point cloud processing.

BACKGROUND

Point cloud is a universal data format across several business domains from autonomous driving, robotics, AR/VR, civil engineering, computer graphics, to the animation/movie industry. 3D LIDAR sensors have been deployed in self-driving cars, and affordable LIDAR sensors are available from Velodyne Velabit, Apple iPad Pro 2020 and Intel RealSense LIDAR camera L515. With great advances in sensing technologies, 3D point cloud data becomes more practical than ever and is expected to be an ultimate enabler in the applications mentioned.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different time.

The automotive industry and autonomous car are domains in which point clouds may be used. Autonomous cars should be able to "probe" their environment to make good driving decisions based on the reality of their immediate surroundings. Typical sensors like LIDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LIDAR as this attribute is indicative of the material of the sensed object and may help in making a decision.

Virtual Reality (VR) and immersive worlds are foreseen by many as the future of video, i.e., rather than only 2D flat video. The basic idea is to immerse the viewer in a surrounding environment as opposed to standard TV where the viewer can only look at the virtual world in front of the viewer. There are several gradations in the immersivity depending on the freedom of the viewer in the environment. Point cloud is a good format candidate to distribute VR worlds. They may be static or dynamic and are typically of averaged size, say no more than millions of points at a time.

Point clouds may be also used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed, e.g., a temple by an earthquake. Such point clouds are typically static, colored, and very large.

Another use case is in topography and cartography in which using 3D representations can lead to maps not being limited to a plane and enables including relief features. Google Maps is an example of 3D maps but uses meshes instead of point clouds. Nevertheless, point clouds may be a suitable data format for 3D maps and such point clouds are typically static, colored, and large data sets.

World modeling and sensing via point clouds can be used to enable machines to gain knowledge about the 3D world around them which can be useful for enabling or advancing various applications such as those discussed above.

SUMMARY

In general, at least one example of an embodiment involves a learned deep entropy model over a tree structure, e.g., octrees, for lossless compression of 3D point cloud data. In general, at least one example of an embodiment can involve self-supervised compression based on an adaptive entropy coder which operates on a tree-structured conditional entropy model. Information from the local neighborhood as well as the global topology can be utilized from the tree structure. In general, at least one example of an embodiment can involve a block-based compression scheme that can facilitate parallel processing and, e.g., reduce required computation and time resources. Such a reduction in resource requirements can be useful for applications such as processing dense massive point clouds.

In general, at least one example of an embodiment can involve apparatus comprising: at least one processor configured to receive an encoded bitstream including compressed data representing a point cloud, wherein the compressed data is compressed based on a tree structure; and decode the encoded bitstream, wherein decoding the encoded bitstream comprises the at least one processor being further configured to, for at least one node of the tree, starting from a root node of the tree structure: obtain data from the bitstream for a current node of the tree structure initialize a default context for the current node; predict an occupancy symbol distribution for the current node using a learning-based entropy model based on context information from the current node and feature information from one or more available neighboring nodes and from one or more ancestor nodes of the current node; and decode the occupancy symbol for the current node using an adaptive entropy decoder based on the occupancy symbol distribution; determine an expanded tree based on the decoded occupancy symbol for at least one node of the tree structure.

In general, at least one example of an embodiment can involve a method comprising: receiving an encoded bitstream including compressed data representing a point cloud, wherein the compressed data is compressed based on a tree structure; and decoding the encoded bitstream, wherein the decoding comprises for at least one node of the tree, starting from a root node of the tree: obtaining data from the bitstream for a current node of the tree; initializing a default context for the current node; predicting an occupancy symbol distribution for the current node using a learning-based entropy model and based on context information from the current node and feature information from one or more available neighboring nodes and from one or more ancestor nodes of the current node; decoding the occupancy symbol for the current node using an adaptive entropy decoder based on the occupancy symbol distribution; determining an expanded tree based on the decoded occupancy symbol for at least one node of 1s the tree structure.

In general, at least one example of an embodiment can involve apparatus comprising: at least one processor configured to compress data representing a point cloud; and provide a combined encoded bitstream including the compressed data, wherein the at least one processor being configured to compress the data comprises the at least one processor being further configured to, convert raw point cloud geometry data included in the data representing the point cloud into a tree representation; initialize a context for all nodes in the tree; for at least one node of the tree, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node to form the combined encoded bitstream, wherein the combined encoded bitstream represents the tree.

In general, at least one example of an embodiment can involve a method comprising: compressing data representing a point cloud; and providing a combined encoded bitstream including the compressed data, wherein the compressing comprises converting raw point cloud geometry data included in the data representing the point cloud into a tree representation; initializing a context for all nodes in the tree; for at least one node of the tree, starting from a root node of the tree structure: predicting an occupancy symbol distribution for a current node in the tree using a learning-based entropy model based on context information from the current node and feature information from one or more neighboring nodes and from one or more ancestor nodes of the current node; encoding an occupancy symbol for the current node into an encoded bitstream representing the current node using an adaptive entropy encoder based on the predicted occupancy distribution; combine the encoded bitstreams representing each node to form the combined encoded bitstream, wherein the combined encoded bitstream represents the tree.

In general, at least one example of an embodiment can involve apparatus comprising: at least one processor configured to receive an encoded bitstream including compressed data representing a point cloud, wherein the compressed data is compressed based on a block-based tree structure; and decode the encoded bitstream, wherein decoding the encoded bitstream comprises the at least one processor being further configured to, obtain from the encoded bitstream both a partitioning bitstream and one or more block bitstreams; decode the partitioning bitstream to recover a shallow partition indicating a block structure of the point cloud data, wherein each of the blocks in the block structure includes a portion of the data representing the point cloud compressed based on the tree structure; for each block, decompress the block bitstream by: for at least one node of the tree structure associated with the block, starting from a root node of the tree structure: obtain data from the bitstream for a current node of the tree structure; initialize a default context for the current node; predict an occupancy symbol distribution for the current node using a learning-based entropy model based on context information from the current node and feature information from one or more available neighboring nodes and from one or more ancestor nodes of the current node; and decode the occupancy symbol for the current node using an adaptive entropy decoder based on the occupancy symbol distribution; determine an expanded tree for the block based on the decoded occupancy symbol for at least one node of the tree structure; combine the expanded tree for each block to provide an expanded tree for the point cloud.

In general, at least one example of an embodiment can involve a method comprising: receiving an encoded bitstream including compressed data representing a point cloud, wherein the compressed data is compressed based on a block-based tree structure; and decoding the encoded bitstream, wherein the decoding comprises: obtaining from the encoded bitstream both a partitioning bitstream and one or more block bitstreams; decoding the partitioning bitstream to recover a shallow partition indicating a block structure of the point cloud data, wherein each of the blocks includes a portion of the data representing the point cloud compressed based on the tree structure; for each block, decompressing the block bitstream by: for at least one node of the tree structure associated with the block, starting from a root node of the tree structure: obtaining data from the bitstream for a current node of the tree structure; initializing a default context for the current node; predicting an occupancy symbol distribution for the current node using a learning-based entropy model based on context information from the current node and feature information from one or more available neighboring nodes and from one or more ancestor nodes of the current node; and decoding the occupancy symbol for the current node using an adaptive entropy decoder based on the occupancy symbol distribution; determine an expanded tree for the block based on the decoded occupancy symbol for at least one node of the tree structure; combine the expanded tree for each block to provide an expanded tree for the point cloud.

In general, at least one example of an embodiment can involve apparatus comprising: at least one processor configured to compress data representing a point cloud; and provide a combined encoded bitstream including the compressed data, wherein the at least one processor being configured to compress the data comprises the at least one processor being further configured to, convert raw point cloud geometry data included in the data representing the point cloud into blocks of data based on a shallow tree structure; shift an origin for each block of data to shift original coordinates of data in each block to local block coordinates; convert each block into a separate tree structure; initialize a context for all nodes in each block; compress the data of each block by, for at least one node of the tree of a block, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node of the block to form an encoded bitstream for the block representing the tree structure of the block combine the encoded bitstreams for each block and information regarding the shallow tree structure to form the combined encoded bit stream.

In general, at least one example of an embodiment can involve a method comprising: compressing data representing a point cloud; and providing a combined encoded bitstream including the compressed data, wherein compressing the data comprises converting raw point cloud geometry data included in the data representing the point cloud into blocks of data based on a shallow tree structure; shifting an origin for each block of data to shift original coordinates of data in each block to local block coordinates; converting each block into a separate tree structure;

initialize a context for all nodes in each block; compressing the data of each block by, for at least one node of the tree of a block, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node of the tree of the block to form an encoded bitstream for the block representing the tree structure of the block combine the encoded bitstreams for each block and information regarding the shallow tree structure to form the encoded combined bit stream.

In general, another example of an embodiment can involve a bitstream or signal formatted to include compressed point cloud information, wherein the point cloud information is encoded by processing based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving a bitstream or signal generated according to methods or apparatus described herein.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below in conjunction with the accompanying figures in which.

Figure 1:
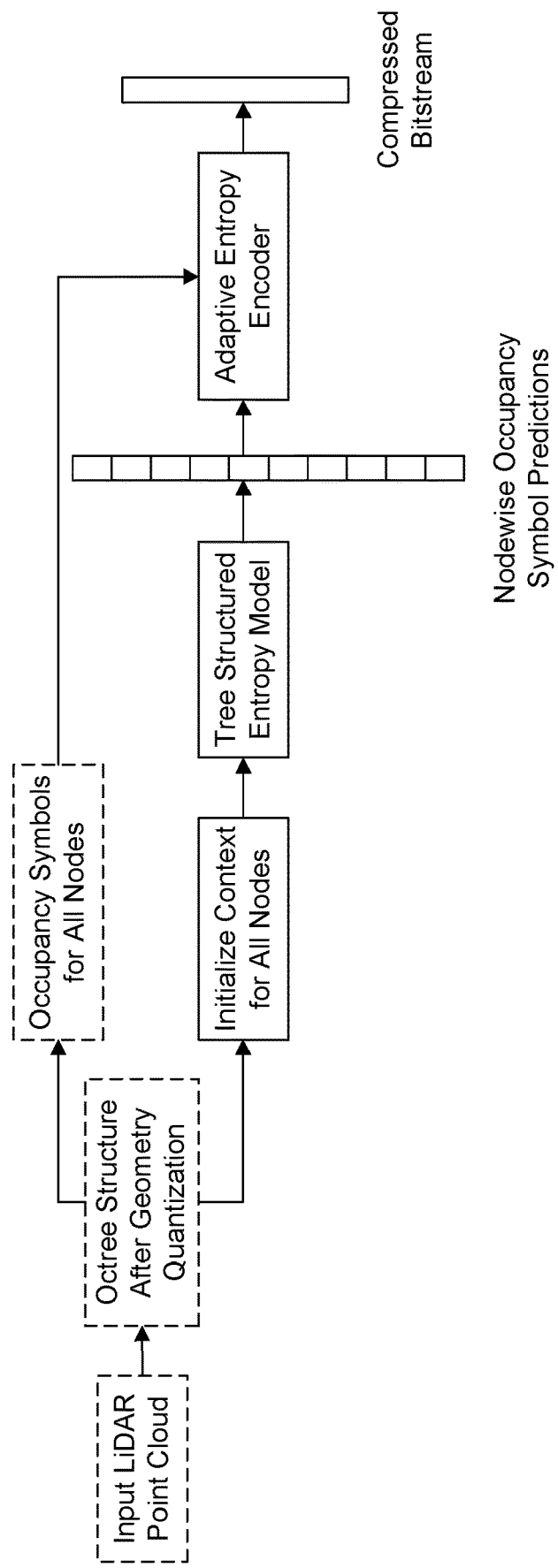
FIG. 1 illustrates an example of an embodiment of a tree entropy encoder in accordance with the present disclosure.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION 3D point cloud data are essentially discrete samples on the surfaces of objects or scenes. To fully represent the real world with point samples can, in practice, require an extremely large number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

Point cloud data can also consume a large portion of network traffic, e.g., among connected cars over 5G network, and immersive communications (VR/AR). Point cloud understanding and communication can lead to efficient representation formats. Appropriate management or handling of raw point cloud data, e.g., proper organization and processing of the data, can be useful for purposes including enabling or facilitating applications such as world modeling and sensing.

The first step for any kind of processing or inference on the point cloud is to have efficient storage methodologies. To store and process the input point cloud with affordable computational cost, one solution is to down-sample it first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression. Better entropy models result in a smaller bitstream and hence more efficient compression. Additionally, the entropy models can be also paired with downstream tasks which allow the entropy encoder to maintain the task specific information while compressing.

The raw data from sensing modalities produces point cloud data containing hundreds of thousands of points that must be stored efficiently. In general, at least one example of an embodiment can involve addressing efficient storage based on PCC via a deep entropy model learned over octrees, which provides a high level of compression performance with control over the level of details by varying the depth of the tree or the quantization level of the input point cloud.

Point cloud compression (PCC) can involve the problem of succinctly representing the surface manifold of the object(s) contained within a point cloud. Various approaches are possible. For example, PCC in the input domain involves downsampling the raw point cloud by choosing or generating novel key points that are representative of the underlying surface manifold. However, PCC in the input domain is only suitable for low compression rates as the one is restricted to remain in the input domain and is primarily used for summarizing point clouds for further downstream processing. Instead of key points, PCC in the primitive domain uses primitives (regular geometric 2D/3D shapes) that are generated to closely follow the underlying object manifold. PCC in the transform domain involves the case when the raw point cloud data is first transformed into another domain via learning-based or classical methods and then this representation in the new domain is compressed to obtain more efficient compression. In general, at least one example of an embodiment in accordance with the present disclosure involves PCC via entropy coding in which either the raw point cloud data or another representation of the point cloud is entropy coded via either adaptive learning-based or classical methods.

In general, at least one example of an embodiment in accordance with the present disclosure can involve processing point cloud information via entropy coding and at least one example of an embodiment can involve learned hierarchical entropy models. In addition to a learned hierarchical entropy model utilizing immediate neighborhood information at the current hierarchical level, at least one example of an embodiment can involve using global information available at the upper hierarchical level. Further details are described below.

Typical raw 3D point clouds acquired from depth sensors contain a large number of points. In general, at least one example of an embodiment described herein can involve efficiently storing and transmitting what can be an extremely large data set associated with point clouds. At least one embodiment described herein can involve performing point compression as a standalone method as well as for subsequent machine tasks (e.g., classification, segmentation, etc.). In general, at least one example of an embodiment can involve lossless compression of not only the point cloud geometry data. Data pertaining to other features such as color or reflectance can also be processed based on one or more examples of embodiments described herein. For example, other features such as color or reflectance can be assumed to be similar to data such as geometry coordinates and exhibit a similar coarse to fine (hierarchical) representation along a tree structure. Hence, one or more examples of embodiments described herein involving an entropy coder could be applied to predict the distribution of such features and thus boost their coding performance. For example, at least one example of an embodiment can involve a deep entropy model built for color or reflectance that can be a separate model from the one build for geometry. In at least one other example of an embodiment, a deep entropy model may be shared. In general, one or more examples of embodiments described herein can involve learning-based deep entropy models.

In general, at least one example of an embodiment of an encoding method is illustrated in FIG. 1 and can be described as follows. For a point cloud encoding system, an input point cloud X with N points, may be first processed/transformed. For example, it can be quantized up to a certain precision resulting in M points. These M points are then further converted into a tree representation up to a certain specified tree depth. Various tree representations or structures can be used. For example, the points can be converted into an octree representation, or a kd-tree representation, or a quadtree plus binary tree (QTBT) representation, or a prediction tree representation, etc.

An octree representation is a straightforward way to divide and represent positions in the 3D space, where a cube containing the whole point cloud is subdivided into 8 sub-cubes. An 8-bit code, called an occupancy code or occupancy symbol, is then generated by associating a 1-bit value with each sub-cube. It is to indicate whether a sub-cube contains points (i.e., with value 1) or not (i.e., with value 0). This division process is performed recursively to form a tree, where only sub-cubes with more than one point are further divided. Similarly to the octree representation, QTBT also divides the 3D space recursively but allows more flexible division using quadtree or binary tree. It is particularly useful for representing sparse distributed point clouds. Different from octree and QTBT which divide the 3D space recursively, a prediction tree defines the prediction structure among the 3D points in a 3D point cloud. Geometry coding using prediction tree can, for example, be beneficial for contents such as LiDAR sequence in PCC. Notice that, with this conversion step, the compression of the raw point cloud geometry becomes the compression of the tree representation.

For ease of explanation, the following description will refer primarily to an octree representation. However, it will be readily apparent to one skilled in the art that the examples of embodiments, features, principles, etc., described herein in the context of an octree representation are also applicable to other types of tree representations. With the original point cloud converted into a tree structure, e.g., octree, at least one example of an embodiment involves a deep learning-based conditional tree structured entropy model to predict the occupancy symbol distributions for all nodes in the tree. This conditional entropy model operates in a nodewise fashion and provides the occupancy symbol distribution of a node depending on its context and features from neighboring nodes in the tree. The tree structure can be traversed using a depth-first or breadth-first traversal.

The occupancy symbol of a node refers to the binary occupancy of each of its 8 children nodes and can be represented as an 8-bit integer from the 8-bit binary children occupancies. The context of a given node contains information such as, for example: occupancy of the parent node, e.g., as an 8-bit integer, the octree depth/level of the given node, the octant of the given node, and the spatial position of the current node. The conditional symbol distribution is then fed into a lossless adaptive entropy coder which compresses each node occupancy resulting in a bitstream.

Figure 2:
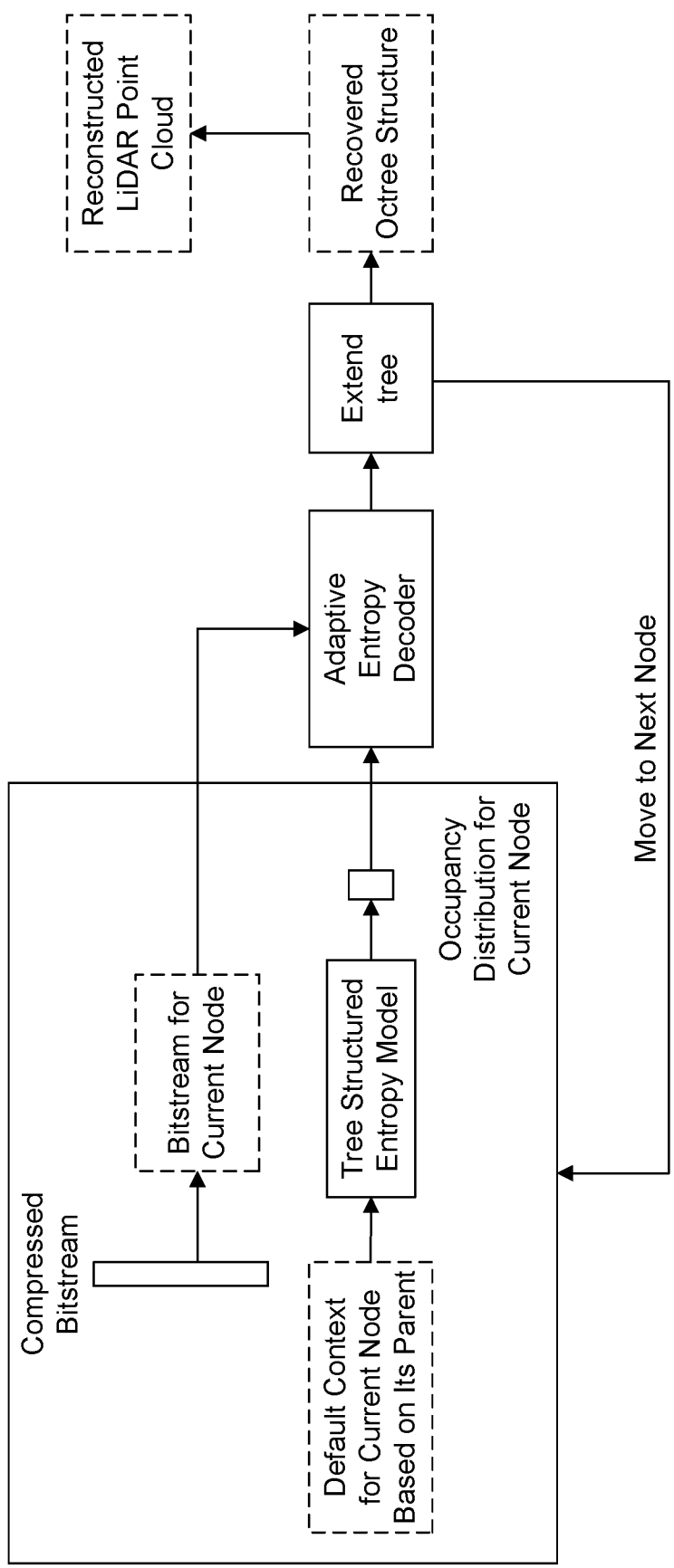
FIG. 2 illustrates an example of an embodiment of a tree entropy decoder in accordance with the present disclosure.

In general, at least one example of a decoding method or apparatus is illustrated in FIG. 2. In FIG. 2, given a compressed bitstream of a point cloud, decoding begins by first generating the default context for the root node. Then the deep entropy model generates the occupancy symbol distribution using the default context of the root node. The adaptive entropy decoder uses this distribution along with the part of the bitstream corresponding to the root node to decode the root occupancy symbol. The context of all children of the root node can now be initialized and the same procedure can be iterated several times to extend and decode the whole tree structure. After the whole tree is decoded, it is converted back to obtain the reconstructed point cloud.

In general, at least one example of an embodiment can involve applying a deep entropy model to predict the occupancy symbol distribution. However, in addition to predicting the distribution with local information from the parent nodes, at least one example of an embodiment can involve utilizing more global information that is available. For example, when predicting the occupancy symbol distribution of a current node, information from one or more sibling nodes as well as from one or more ancestor nodes can be utilized.

Figure 3:
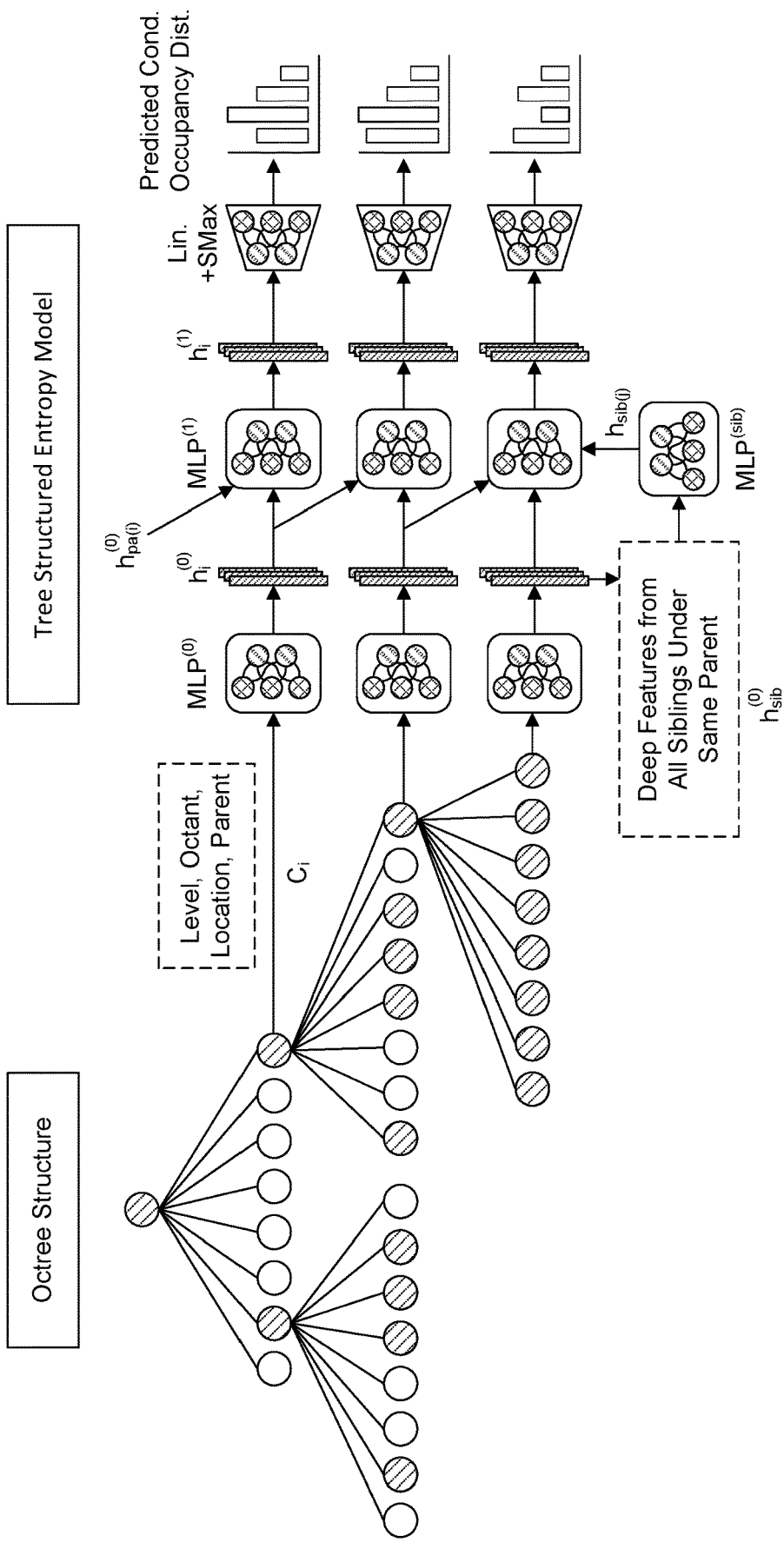
FIG. 3 illustrates an example of a learning-based deep entropy embodiment in accordance with the present disclosure.

In general, at least one example of a deep entropy model in accordance with the present disclosure is illustrated in FIG. 3. In the example of FIG. 3, processing an octree structure can be based on learning a deep conditional tree structured entropy model. This conditional entropy model operates in a nodewise fashion. The operation can be serial or the operation can be parallelized. The operation predicts the probability distribution for the occupancy symbol of a node depending on its context and its neighboring nodes, including one or more sibling nodes and one or more ancestor nodes. This conditional occupancy symbol distribution is then further used by either an adaptive entropy encoder or decoder to compress or decompress the tree structure.

In general, at least one example of an embodiment an involve training a deep entropy model using the octree representation of a point cloud dataset containing numerous individual point clouds. The model then takes the context of each node and features from its neighbors as input, and outputs the conditional occupancy symbol distribution. Then, cross entropy loss on the i-th node is computed as $l_i = -\sum_{j=1}^{256} y_{ij} \log q_{ij}$. Here $y_i$ is the vector of one-hot encoded ground truth symbols of the i-th node, and $q_i$ represents the vector of predicted distribution of the symbols for the i-th node. The network is trained to minimize this loss over all nodes in all octrees in a self-supervised fashion.

Point cloud compression can occur based on only training over one input precision and using that trained model to compress point clouds at several different input precisions. However, this procedure can be sub-optimal and result in poor compression performance for input precisions not encountered during the training phase. In general, at least one example of an embodiment enables performing well at several levels of precision based on training a model at a set highest geometry precision as well as several quantized versions of the input. This results in more robust training and provides better generalization for the model.

In addition to the precision of the point cloud, what also matters is the distribution of points within the point cloud. As different acquisition modalities result in vastly different distributions of the points in the raw point cloud, at least one example of an embodiment can involve training a model specifically on one kind of data, e.g., LiDAR, or VR/AR data, when high compression rates are required. However, if a more general model is required that on average performs well over several different kinds of datasets, then different types of datasets can be combined into one and then the model can be trained on this combined dataset. In general, at least one example of an embodiment involves training adaptable to the target application and the target compression performance.

The following describes various examples of embodiments involving a deep entropy coding module in an encoder. However, the described embodiments, e.g., the described embodiments of a deep entropy module, can also be applied in a corresponding decoder.

In general, at least one embodiment can involve an octree-structured learned conditional entropy model. For example, at least one embodiment can involve a conditional entropy model incorporating deep features of the sibling nodes to predict the occupancy symbols of all sibling nodes simultaneously. That is, neighborhood information from siblings can be fully exploited. In more detail, let context of a given node i be represented as the vector $c_i$. Furthermore, consider a deep neural network comprising several concatenated Multilayer Perceptron (MLP) modules, where the k-th MLP module is denoted by $MLP^{(k)}$. Then, the initial deep feature of a particular node is obtained as $h_i^{(0)} = MLP^{(0)}(c_i)$. Starting with this initial feature for each node, which can be obtained in parallel, subsequent deep features can be obtained (also in parallel) as $h_i^{(k)} = MLP^{(k)}(h_i^{(k-1)}, h_{pa(i)}^{(k-1)})$, where $h_{pa(i)}^{(k-1)}$ is the deep feature of the parent node of the given i-th node from the $MLP^{(k-1)}$. It should be noted here that each $MLP^{(k)}$ is shared between all nodes. The final MLP, denoted by $MLP^{(K)}$, is special as it takes an additional deep feature as input which is constructed from the deep features of all sibling nodes as $h_{sib(i)} = \max(MLP^{(sib)}(h_{sib(i)}^{(K-1)}))$, where $MLP^{(sib)}$ first operates individually on deep features of each sibling node of the i-th node (including itself) and then the pooling function (e.g., $\max(.)$) operates on the resulting features in each dimension to produce an overall combined deep feature of the same length as the input features. In this way, the final deep feature of the i-th node is obtained as $h_i^{(K)} = MLP^{(K)}(h_i^{(K-1)}, h_{sib(i)}, h_{pa(i)}^{(K-1)})$. This final feature is then passed through a linear layer and then a softmax to produce 256-dimensional vector of probabilities for each of 256 possible 8-bit occupancy symbols.

Figure 4:
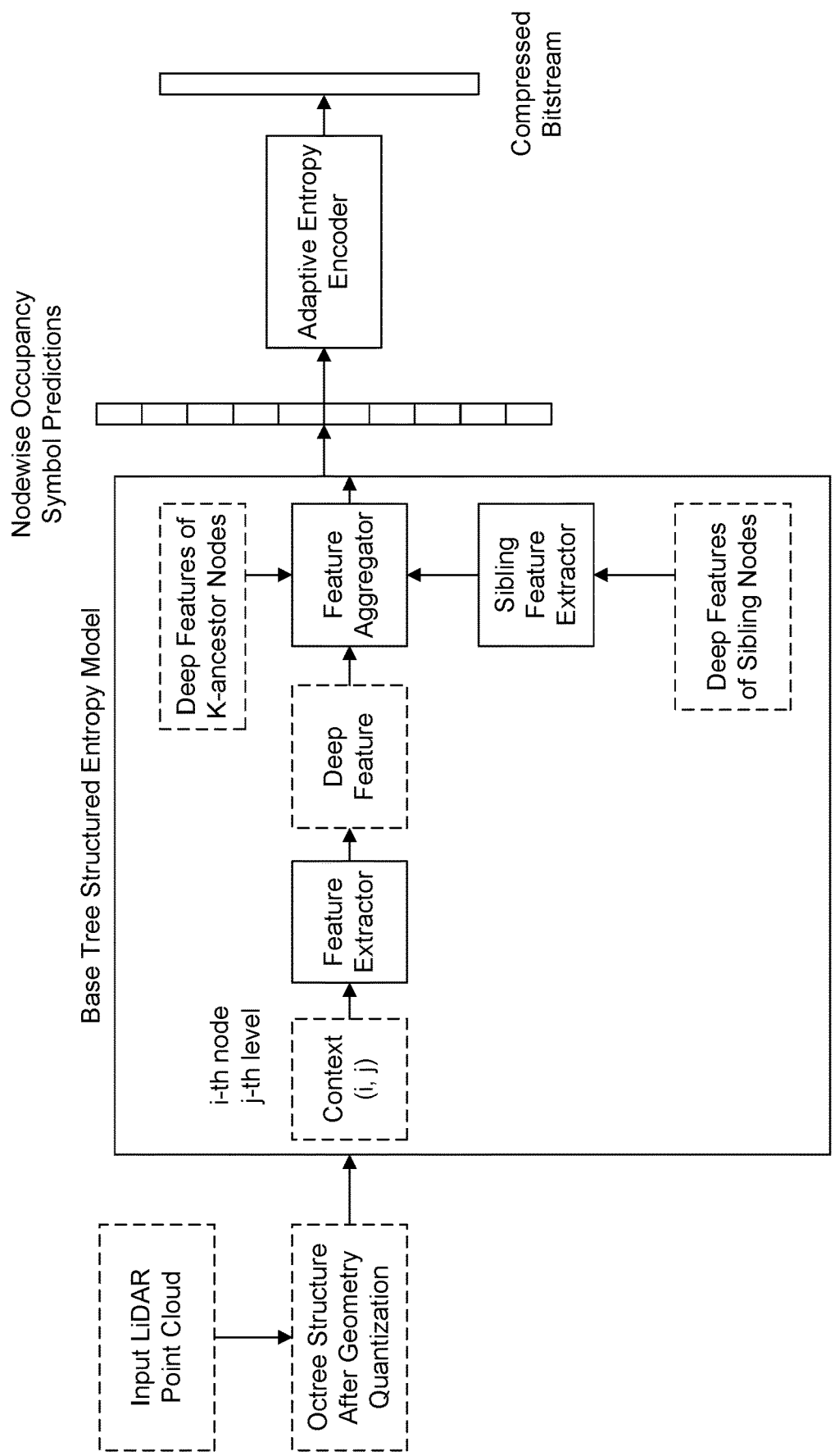
FIG. 4 illustrates, in block diagram form, an example of a first embodiment in the context of encoding in accordance with the present disclosure.

An example of an embodiment of a deep entropy coding arrangement is shown in FIG. 4 in an encoder. In the figure, "Feature Extractor" refers to $MLP^{(0)}$, "Sibling Feature Extractor" denotes the $MLP^{(sib)}$, while the remaining MLPs are bundled together in "Feature Aggregator". As an example, the embodiment illustrated in FIG. 4 can be based on an architecture such as the following. The first MLP is 5 layers deep with 128-dimensional hidden features. All hidden MLPs include 3 residual layers and the same 128-dimensional hidden features. The additional MLP(sib) is a single layer MLP also having 128-dimensional hidden feature. The final linear layer produces a 256-dimensional output followed by softmax to produce 256-dimensional probability vector. The layers in all MLPs are linear layers followed by a ReLU, without normalization.

Although one or more examples of a deep entropy model in accordance with the present disclosure operate nodewise and use deep features from ancestor nodes, during an encoding process each MLP can be executed in parallel on all nodes. This is because the deep features used from ancestors are the output of the previous MLP module. While using the deep entropy model during decoding, however, the ancestor nodes must be decoded before moving down the octree. Thus, decoding can operate in parallel only over sibling nodes. That is, one or more examples of embodiments in this disclosure can operate during encoding in parallel over all nodes and, during decoding, can operate in parallel only over sibling nodes.

Figure 5:
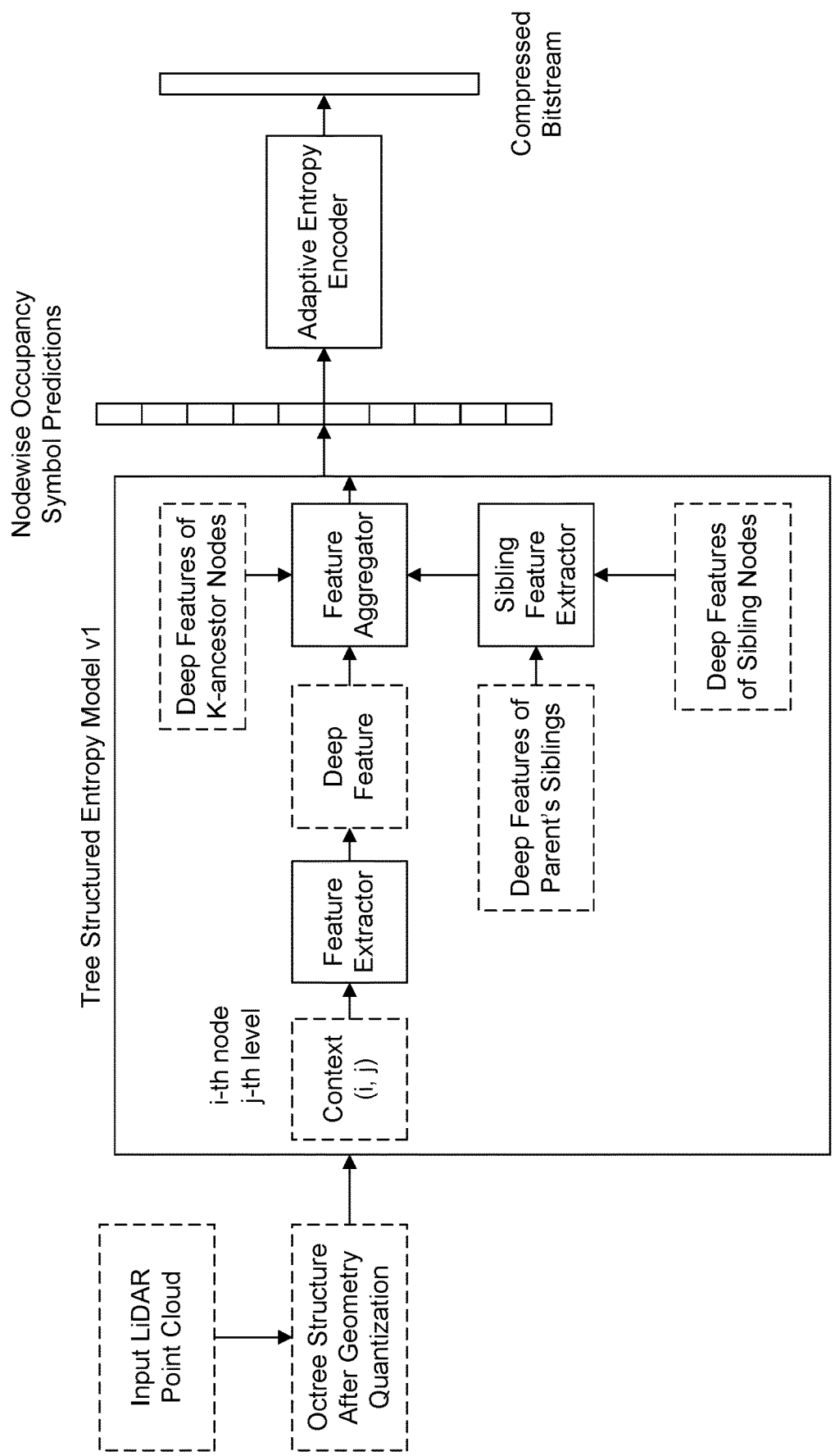
FIG. 5 illustrates, in block diagram form, another example of an embodiment in the context of encoding in accordance with the present disclosure.

Another example of an embodiment of a deep entropy coding arrangement is shown in FIG. 5 in the context of an encoder. The example in FIG. 5 illustrates an embodiment based on an octree-structured learned conditional entropy model. More specifically, FIG. 5 illustrates an example of an embodiment differing from the embodiment of FIG. 4 in the way that the deep features of the ancestor nodes, e.g., parent nodes, are used. Instead of using the deep feature of just the parent node, in the example of FIG. 5 the $MLP^{(sib)}$ (used earlier to gather features of all siblings) gathers the deep feature of the parent node and all of its siblings under the same grandparent node. This produces richer deep features that contain more information from the parent level with no additional parameters required as the MLP is being shared.

Figure 6:
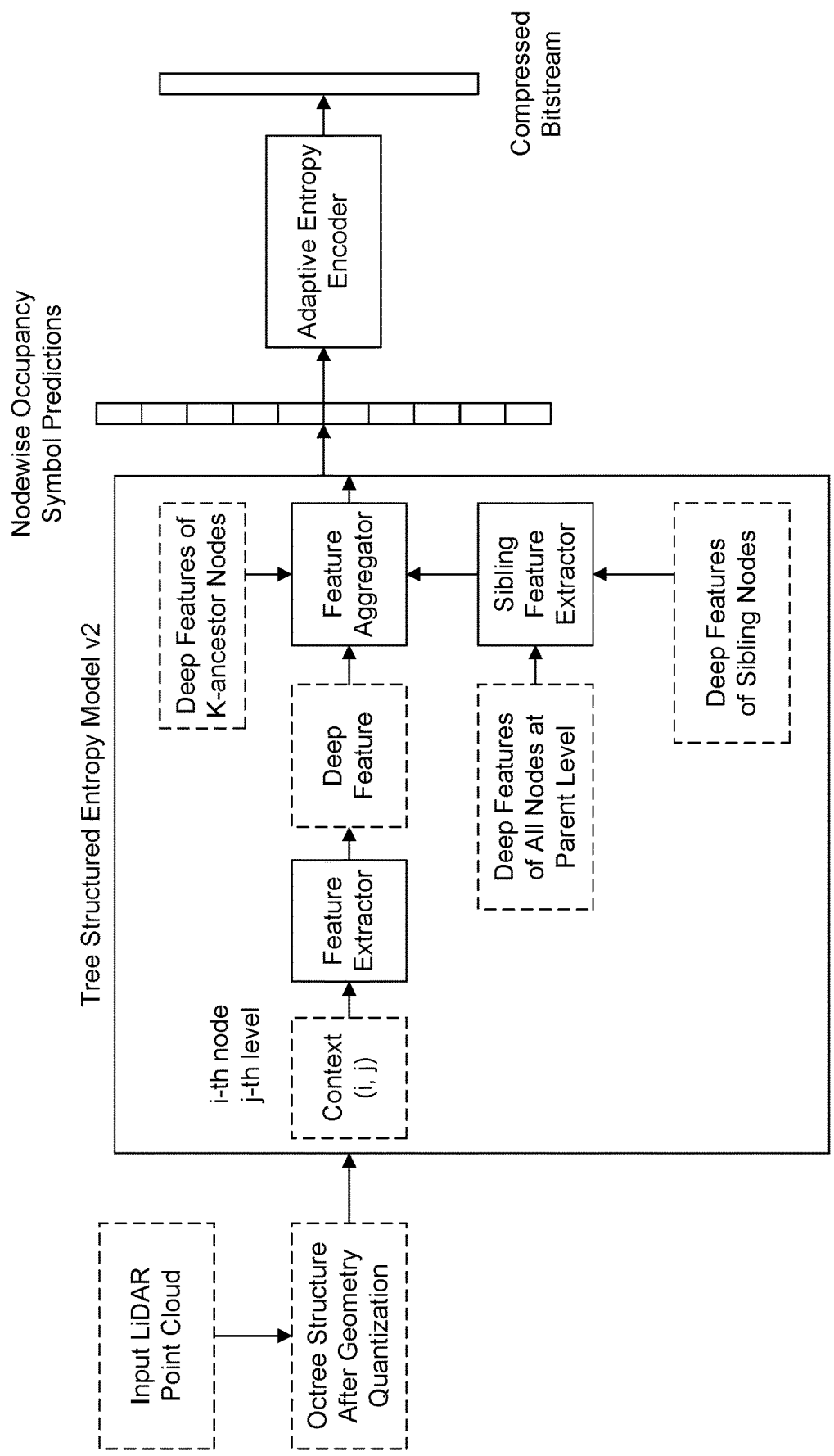
FIG. 6 illustrates, in block diagram form, another example of an embodiment in the context of encoding in accordance with the present disclosure.

Another example of an embodiment of a deep entropy coding arrangement is shown in FIG. 6 in the context of an encoder. The example in FIG. 6 illustrates another example of an embodiment based on an octree-structured learned conditional entropy model. In the example of FIG. 6, even richer features can be extracted from ancestors, e.g., by utilizing features from all nodes at an ancestor level such as a parent level instead of just the parent's siblings. Utilizing features from all nodes at a higher level produces a feature vector representing the coarse global topology of the object comprising the point cloud. This aggregation of features from all nodes at a higher level is referred to herein as a "global feature".

Figure 7:
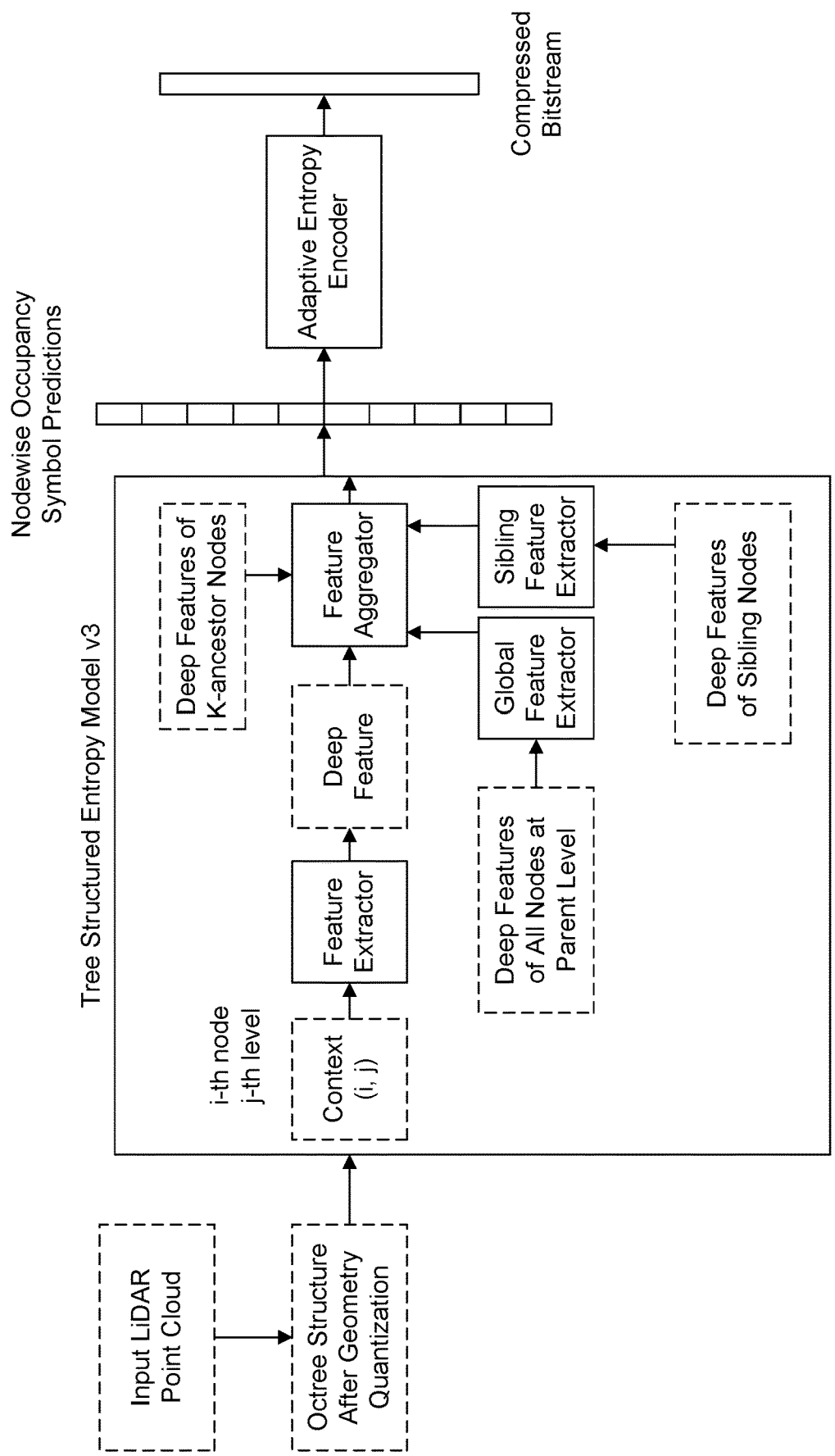
FIG. 7 illustrates, in block diagram form, another example of an embodiment in the context of encoding in accordance with the present disclosure.

Another example of an embodiment of a deep entropy coding arrangement is shown in FIG. 7 in the context of an encoder. The example in FIG. 7 illustrates another example of an embodiment based on an octree-structured learned conditional entropy model. In the example of FIG. 7, the MLP that gathers the deep features from all siblings of a particular node and the one that gathers features from all nodes at the parent level operate at different scales. One processes local information within a neighborhood and the other extracts information from the global manifold shape. Due to this difference in scales, a separate $MLP^{(pa)}$ is introduced to gather features at the parent level. In FIG. 7, the $MLP^{(pa)}$ is referred to as the "Global Feature Extractor".

Figure 8:
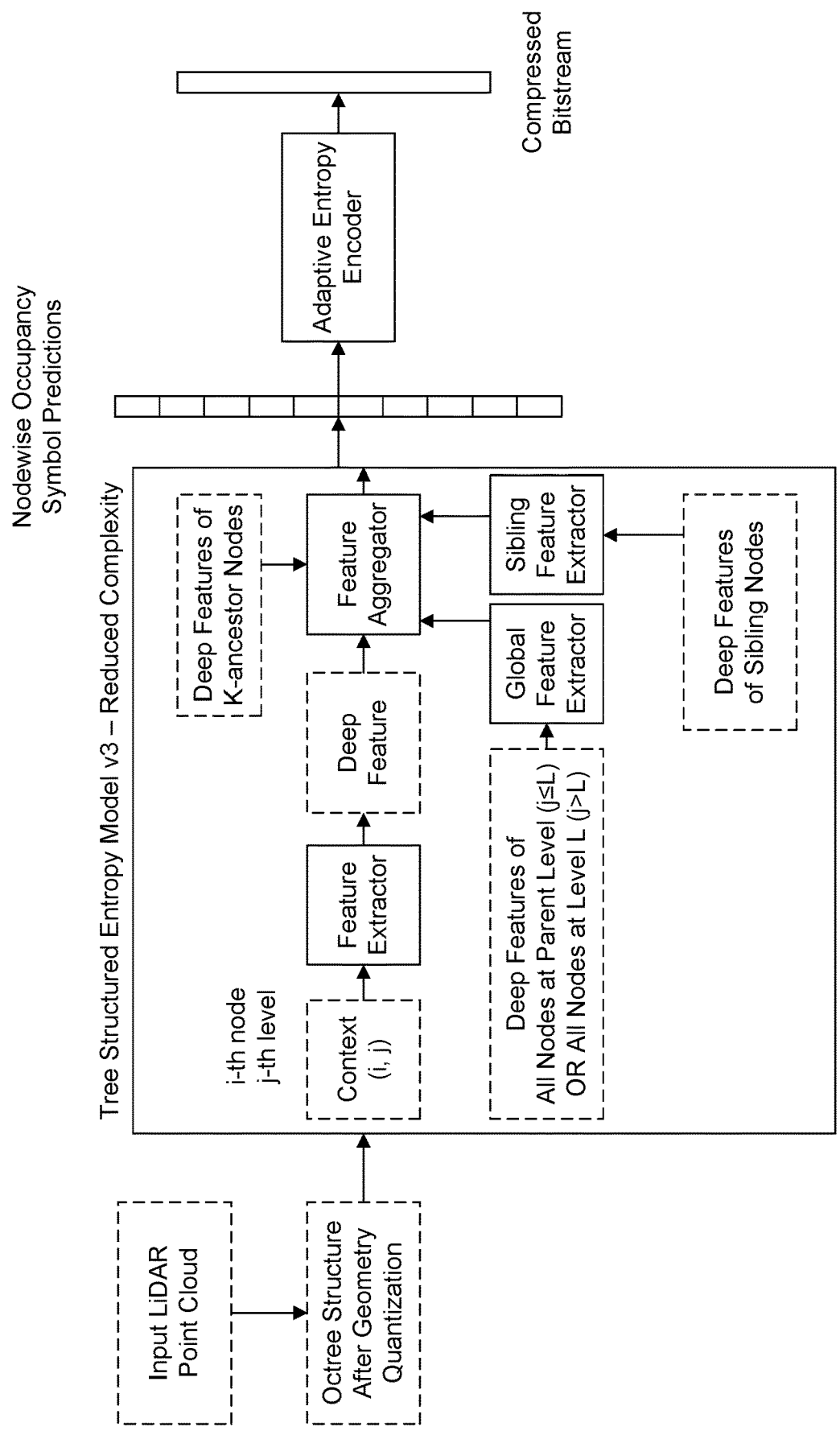
FIG. 8 illustrates, in block diagram form, another example of an embodiment in the context of encoding in accordance with the present disclosure.

Another example of an embodiment of a deep entropy coding arrangement is shown in FIG. 8 in the context of an encoder. The example in FIG. 8 illustrates another example of an embodiment based on an octree-structured learned conditional entropy model. However, the example of FIG. 8 provides a complexity-reduced arrangement. One or more preceding examples of embodiments, e.g., examples of embodiments illustrated in FIGS. 6 and 7, can involve obtaining the global features of the point cloud based on involving all nodes from an immediate parent level in computation. This may lead to a high computation cost when going deeper in the tree structure. On the other hand, the additional benefit in generating global features by going one layer deeper may become rather limited after a certain tree layer, e.g., layer k, has been reached. Thus, the example of FIG. 8 provides for using layer k to generate the global features for all layers deeper than k+1. As an example, k is set to 4 when the total depth is equal to 6; and k is set to 10 when the total depth is equal to 12. The determination or identification of layer k can be based on, for example, a cost-benefit analysis and/or a particular application and/or availability of resources such as computational resources.

Another example of an embodiment of a deep entropy coding arrangement can involve an embodiment such as any of those described herein, e.g., examples of embodiments in FIG. 4 to 8, based on a tree representation or structure or arrangement other than octree. For example, rather than converting raw point cloud data to an octree structure, at least one example of an embodiment can involve usage of other tree representations or structures such as kd-tree, or quad tree plus binary tree (QTBT), or prediction tree, etc.

Figure 9:
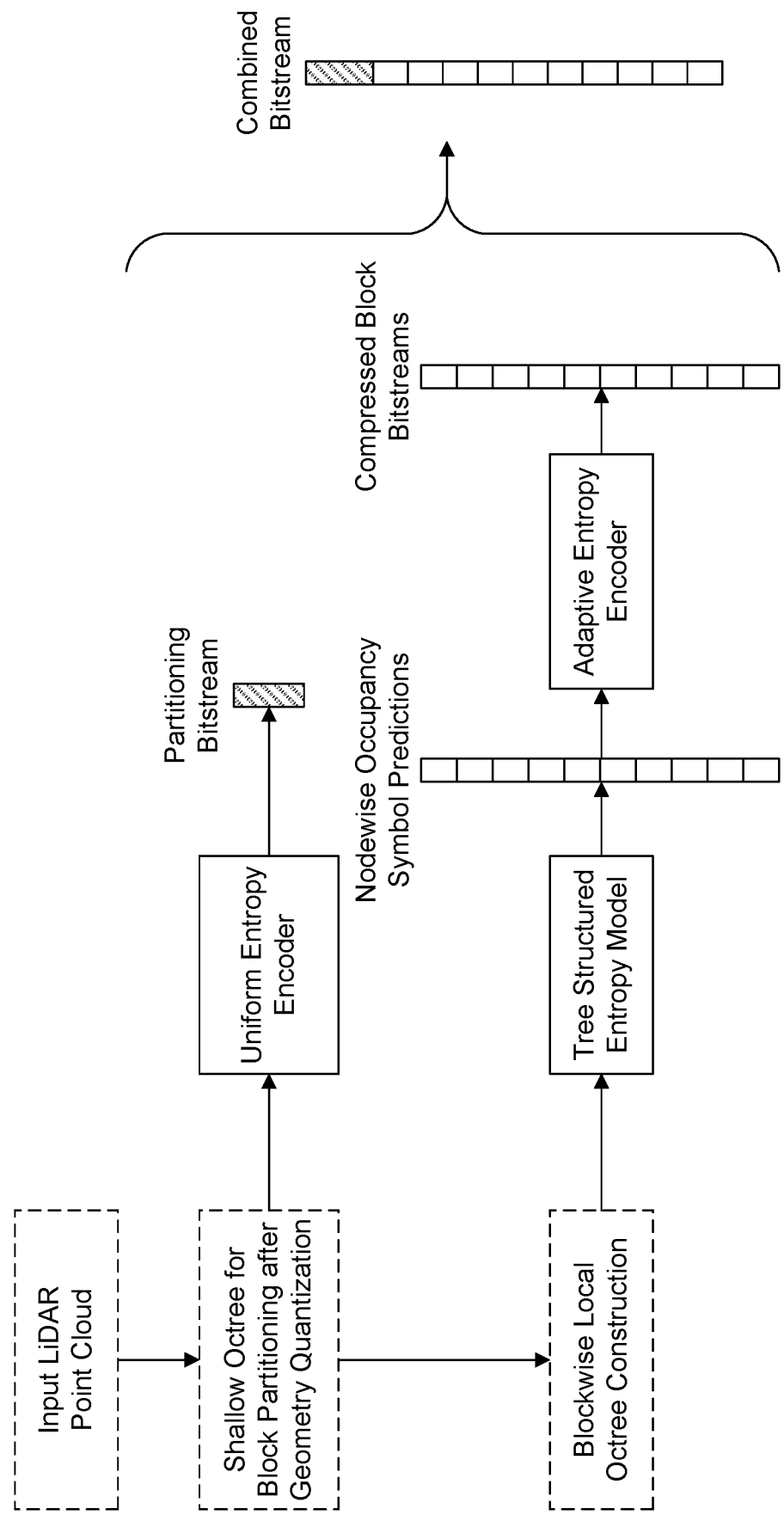
FIG. 9 illustrates, in block diagram form, another example of an embodiment in the context of encoding in accordance with the present disclosure.
Figure 10:
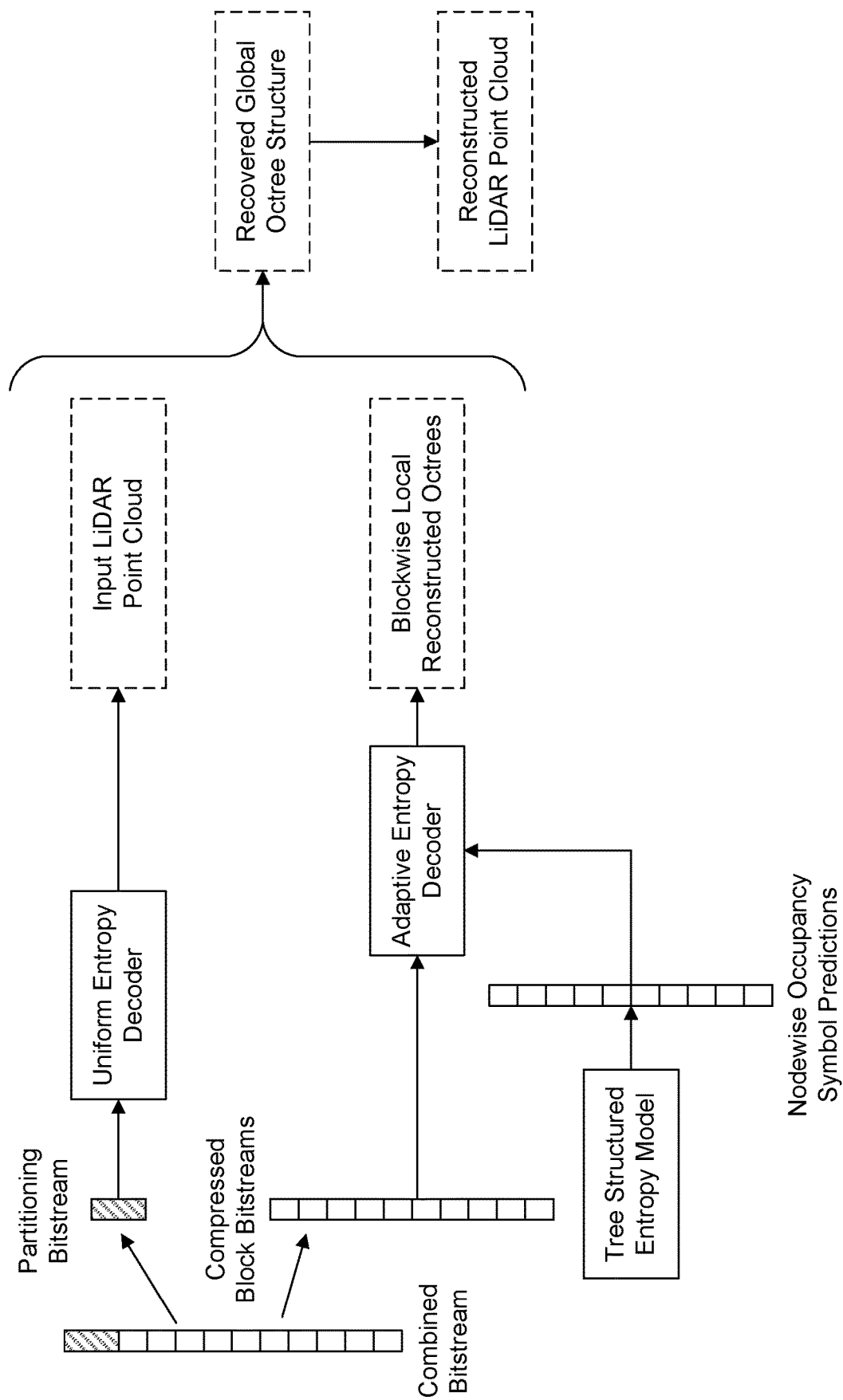
FIG. 10 illustrates, in block diagram form, an example of an embodiment in the context of decoding in accordance with the present disclosure.

Another example of an embodiment of a deep entropy coding arrangement is illustrated in FIG. 9 in the context of an encoder and in FIG. 10 in the context of a decoder. One or more other examples of embodiments described herein can involve converting the whole point cloud into a single octree representation and then losslessly compressing this octree. However, this procedure becomes increasingly time consuming and computationally expensive as the geometry data precision and the density of points in the point cloud increases. Moreover, the process of converting the raw data into octree representation takes longer as well. As an example of an approach to dealing with this issue, the example of an embodiment illustrated in FIG. 9 involves convert the raw point cloud into blocks via a shallow tree structure, e.g., octree, bringing the data points in each block from the original coordinates to the local block coordinates (by shifting the origin for each block), and finally converting each block data into a separate tree structure, e.g., octree. With this procedure, each block contains a smaller part of the point cloud which can be converted to a tree structure, e.g., an octree, faster and in parallel for each block. After lossless compression and decompression, the recovered points from each block are combined and brought back into the original coordinates. The auxiliary information from the shallow tree structure, e.g., octree, regarding the block partitioning is also compressed using uniform entropy coding and added to the bitstream. FIG. 10 illustrates an example of a decoding arrangement based on the described example of a block-based embodiment.

Figure 12:
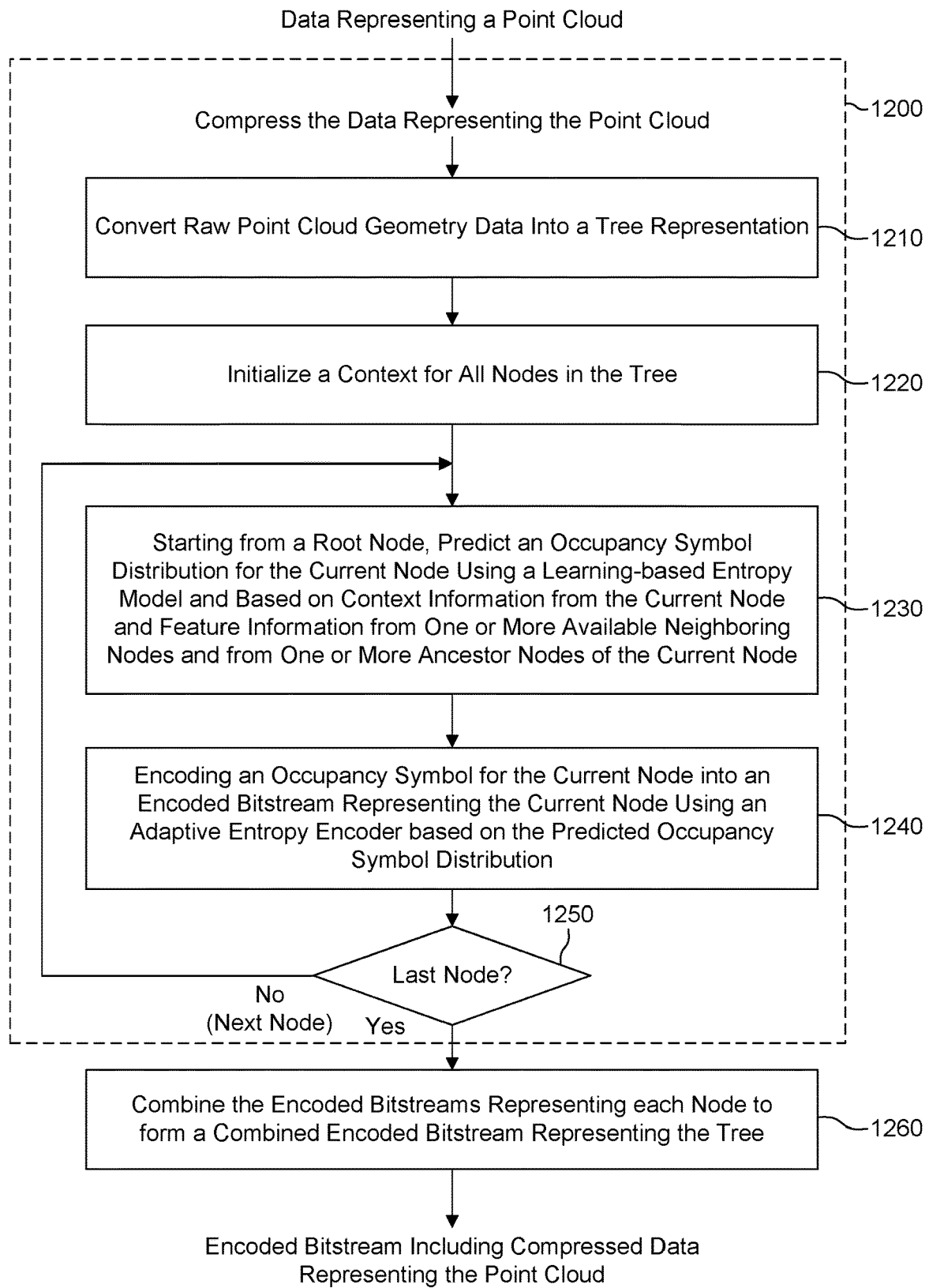
FIG. 12 illustrates, in flow diagram form, another example of an embodiment in accordance with the present disclosure.
Figure 13:
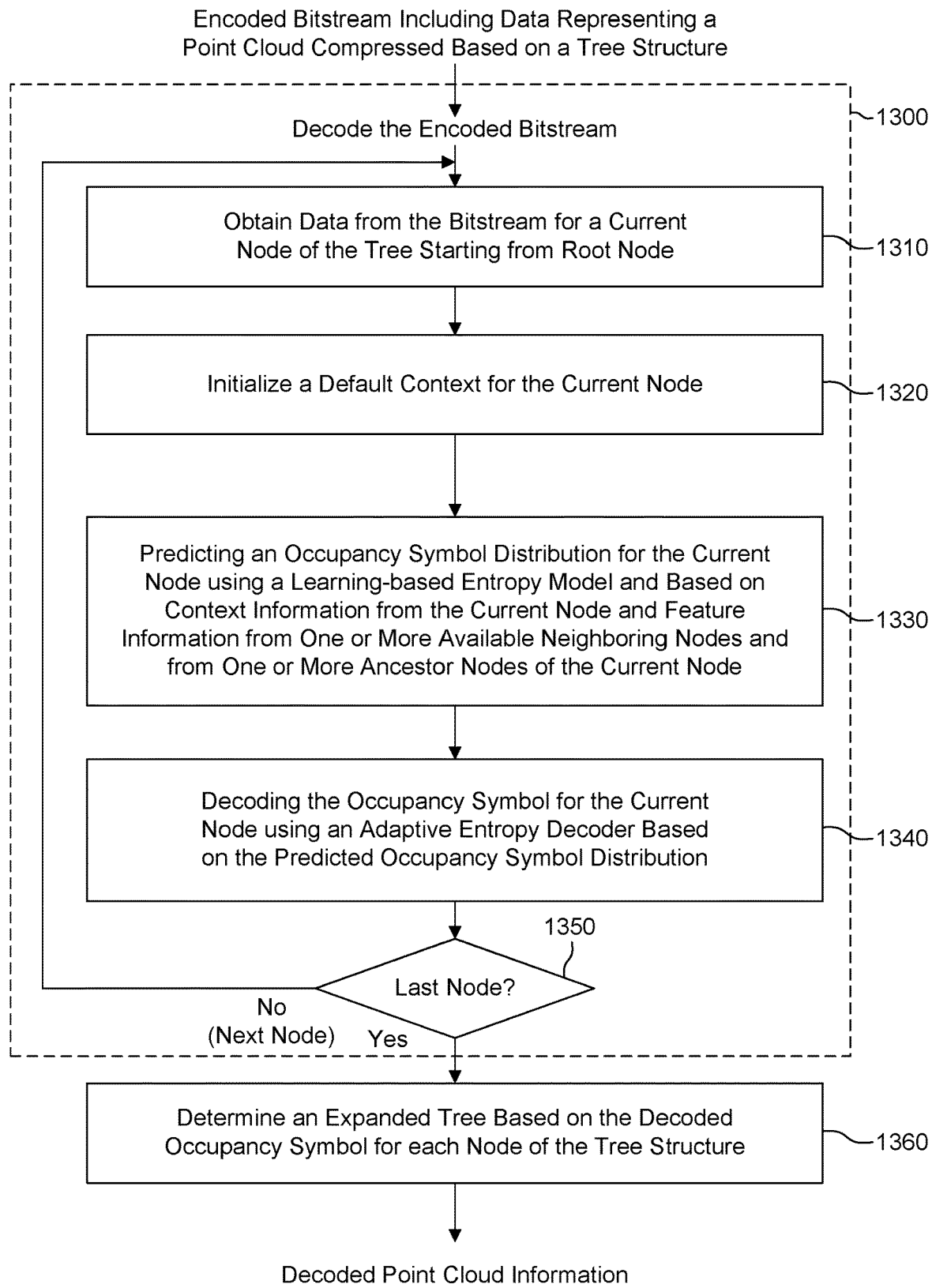
FIG. 13 illustrates, in flow diagram form, another example of an embodiment in accordance with the present disclosure.

FIGS. 12 and 13 illustrate other examples of embodiments in accordance with one or more aspects or features of one or more embodiments described herein. In the example of an embodiment illustrated in FIG. 12, operation at 1200 receives data representing a point cloud, compresses the data, and provides encoded bitstreams that are combined at 1260 to produce an encoded bitstream including compressed data representing the point cloud. In more detail regarding operation at 1200, at 1210 raw point cloud geometry data is converted into a tree representation, e.g., an octree structure. Operation at 1220 initializes a context for all nodes in the tree. Operations at 1230 through 1250 are repeated iteratively for every node in the tree structure starting with the root node. At 1230, an occupancy symbol distribution for a current node is predicted using a learning-based entropy model and based on context information from the current node and feature information from one or more available neighboring nodes and from one or more ancestor nodes of the current node. Operation at 1240 encodes an occupancy symbol for the current node into an encoded bitstream representing the current node using an adaptive entropy encoder based on the predicted occupancy symbol distribution. At 1250, a check is made to determine if the current node is the last or final node of the tree structure, i.e., all nodes have been processed. If not ("no" at 1250), then operation returns to 1230 where a node that has not been processed becomes the current node and is processed through 1230 and 1240. If at 1250 the current node is the last node ("yes" at 1250) then operation continues at 1260 where the encoded bitstreams representing each node are combined to form a combined encoded bitstream representing the tree. The result of the embodiment in FIG. 12 is an encoded bitstream including compressed data representing the point cloud.

FIG. 13 illustrates an example of an embodiment of a decoder that is suitable for decoding an encoded bitstream including compressed data representing a point cloud where the encoded bitstream was produced by and encoder embodiment such as that illustrated in FIG. 12 and described above. In the example of an embodiment illustrated in FIG. 13, operation at 1300 receives and decodes an encoded bitstream including data representing a point cloud and compressed based on a tree structure such as an octree. The decoded output from 1300 is processed at 1360 to determine an expanded tree based on the decoded occupancy symbol for each node of the tree structure. The expanded tree represents decoded point cloud information. In more detail, operation at 1300 includes iteratively repeating 1310 through 1350 for all nodes in the tree structure starting at the root node. At 1310, data is obtained from the encoded bitstream for a current node of the tree structure followed by 1320 where a default context for the current node is initialized. At 1330, an occupancy symbol distribution for the current node is predicted using a learning-based entropy model and based on context information from the current node and feature information from one or more available neighboring nodes and from one or more ancestor nodes of the current node. Operation at 1240 decodes an occupancy symbol for the current node using an adaptive entropy decoder based on the predicted occupancy symbol distribution. At 1350, a check is made to determine if the current node is the last or final node of the tree structure, i.e., all nodes have been processed. If not ("no" at 1350), then operation returns to 1310 where a node that has not been processed becomes the current node and is processed through 1310 to 1440. If at 1350 the current node is the last node ("yes" at 1350) then operation continues at 1360 where an expanded tree is determined based on the decoded occupancy symbol for each node of the tree structure. The result of the embodiment in FIG. 13 is decoded information representing the point cloud.

Figure 11:
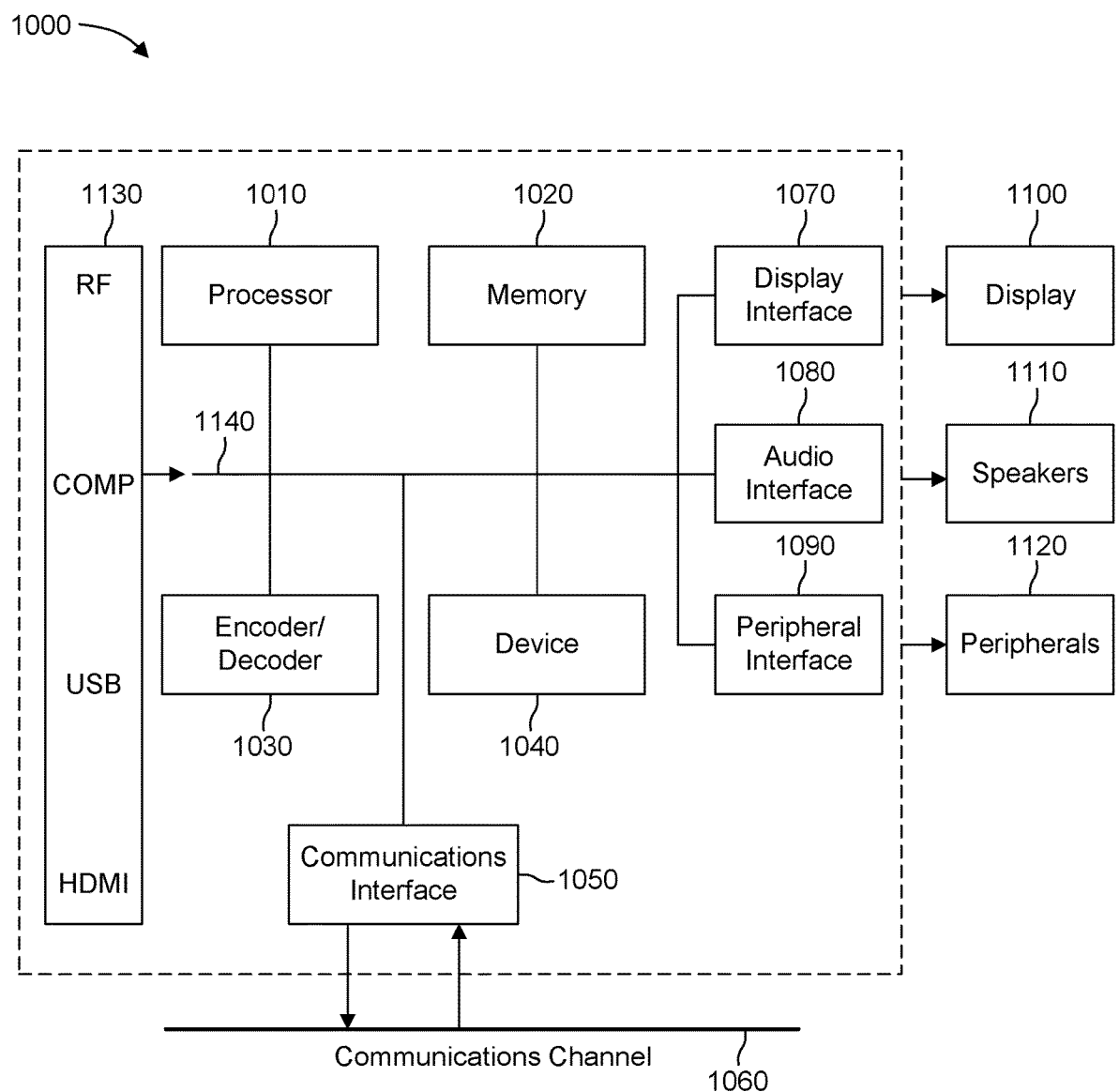
FIG. 11 illustrates, in block diagram form, an example of an embodiment of apparatus or a device or a system suitable for implementing one or more aspects, embodiments, or features in accordance with the present disclosure.

FIG. 11 illustrates a block diagram of an example of a system suitable for implementing one or more of the examples of embodiments described herein. System 1000 in FIG. 11 can be embodied as a device including the various components described below and is configured to perform or implement one or more of the examples of embodiments, features, etc. described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In general, the system 1000 is configured to implement one or more of the examples of embodiments, features, etc. described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030, e.g., to perform or implement one or more examples of embodiments, features, etc., described in this document, can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various generalized as well as particularized embodiments are also supported and contemplated throughout this disclosure. Examples of embodiments in accordance with the present disclosure include but are not limited to the following.

In general, at least one example of an embodiment can involve a learned deep entropy model over a tree structure, e.g., octrees, for lossless compression of 3D point cloud data. In general, at least one example of an embodiment can involve self-supervised compression based on an adaptive entropy coder which operates on a tree-structured conditional entropy model. Information from the local neighborhood as well as the global topology can be utilized from the tree structure. In general, at least one example of an embodiment can involve a block-based compression scheme that can facilitate parallel processing and, e.g., reduce required computation and time resources. Such a reduction in resource requirements can be useful for applications such as processing dense massive point clouds.

In general, at least one example of an embodiment can involve apparatus comprising: at least one processor configured to receive an encoded bitstream including compressed data representing a point cloud, wherein the compressed data is compressed based on a tree structure; and decode the encoded bitstream, wherein decoding the encoded bitstream comprises the at least one processor being further configured to, for each node of the tree, starting from a root node of the tree structure: obtain data from the bitstream for a current node of the tree structure initialize a default context for the current node; predict an occupancy symbol distribution for the current node using a learning-based entropy model based on context information from the current node and feature information from one or more available neighboring nodes and from one or more ancestor nodes of the current node; and decode the occupancy symbol for the current node using an adaptive entropy decoder based on the occupancy symbol distribution; determine an expanded tree based on the decoded occupancy symbol for each node of the tree structure.

In general, at least one example of an embodiment can involve a method comprising: receiving an encoded bitstream including compressed data representing a point cloud, wherein the compressed data is compressed based on a tree structure; and decoding the encoded bitstream, wherein the decoding comprises for each node of the tree, starting from a root node of the tree: obtaining data from the bitstream for a current node of the tree; initializing a default context for the current node; predicting an occupancy symbol distribution for the current node using a learning-based entropy model and based on context information from the current node and feature information from one or more available neighboring nodes and from one or more ancestor nodes of the current node; decoding the occupancy symbol for the current node using an adaptive entropy decoder based on the occupancy symbol distribution; determining an expanded tree based on the decoded occupancy symbol for each node of the tree structure.

In general, at least one example of an embodiment can involve apparatus comprising: at least one processor configured to compress data representing a point cloud; and provide a combined encoded bitstream including the compressed data, wherein the at least one processor being configured to compress the data comprises the at least one processor being further configured to, convert raw point cloud geometry data included in the data representing the point cloud into a tree representation; initialize a context for all nodes in the tree; for each node of the tree, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node to form the combined encoded bitstream, wherein the combined encoded bitstream represents the tree.

In general, at least one example of an embodiment can involve a method comprising: compressing data representing a point cloud; and providing a combined encoded bitstream including the compressed data, wherein the compressing comprises converting raw point cloud geometry data included in the data representing the point cloud into a tree representation; initializing a context for all nodes in the tree; for each node of the tree, starting from a root node of the tree structure: predicting an occupancy symbol distribution for a current node in the tree using a learning-based entropy model based on context information from the current node and feature information from one or more neighboring nodes and from one or more ancestor nodes of the current node; encoding an occupancy symbol for the current node into an encoded bitstream representing the current node using an adaptive entropy encoder based on the predicted occupancy distribution; combine the encoded bitstreams representing each node to form the combined encoded bitstream, wherein the combined encoded bitstream represents the tree.

In general, at least one example of an embodiment can involve apparatus comprising: at least one processor configured to receive an encoded bitstream including compressed data representing a point cloud, wherein the compressed data is compressed based on a block-based tree structure; and decode the encoded bitstream, wherein decoding the encoded bitstream comprises the at least one processor being further configured to, obtain from the encoded bitstream both a partitioning bitstream and one or more block bitstreams; decode the partitioning bitstream to recover a shallow partition indicating a block structure of the point cloud data, wherein each of the blocks in the block structure includes a portion of the data representing the point cloud compressed based on the tree structure; for each block, decompress the block bitstream by: for each node of the tree structure associated with the block, starting from a root node of the tree structure: obtain data from the bitstream for a current node of the tree structure; initialize a default context for the current node; predict an occupancy symbol distribution for the current node using a learning-based entropy model based on context information from the current node and feature information from one or more available neighboring nodes and from one or more ancestor nodes of the current node; and decode the occupancy symbol for the current node using an adaptive entropy decoder based on the occupancy symbol distribution; determine an expanded tree for the block based on the decoded occupancy symbol for each node of the tree structure; combine the expanded tree for each block to provide an expanded tree for the point cloud.

In general, at least one example of an embodiment can involve a method comprising: receiving an encoded bitstream including compressed data representing a point cloud, wherein the compressed data is compressed based on a block-based tree structure; and decoding the encoded bitstream, wherein the decoding comprises: obtaining from the encoded bitstream both a partitioning bitstream and one or more block bitstreams; decoding the partitioning bitstream to recover a shallow partition indicating a block structure of the point cloud data, wherein each of the blocks includes a portion of the data representing the point cloud compressed based on the tree structure; for each block, decompressing the block bitstream by: for each node of the tree structure associated with the block, starting from a root node of the tree structure: obtaining data from the bitstream for a current node of the tree structure; initializing a default context for the current node;
predicting an occupancy symbol distribution for the current node using a learning-based entropy model based on context information from the current node and feature information from one or more available neighboring nodes and from one or more ancestor nodes of the current node; and decoding the occupancy symbol for the current node using an adaptive entropy decoder based on the occupancy symbol distribution; determine an expanded tree for the block based on the decoded occupancy symbol for each node of the tree structure; combine the expanded tree for each block to provide an expanded tree for the point cloud.

In general, at least one example of an embodiment can involve apparatus comprising: at least one processor configured to compress data representing a point cloud; and provide a combined encoded bitstream including the compressed data, wherein the at least one processor being configured to compress the data comprises the at least one processor being further configured to, convert raw point cloud geometry data included in the data representing the point cloud into blocks of data based on a shallow tree structure; shift an origin for each block of data to shift original coordinates of data in each block to local block coordinates; convert each block into a separate tree structure; initialize a context for all nodes in each block; compress the data of each block by, for each node of the tree of a block, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node of the block to form an encoded bitstream for the block representing the tree structure of the block combine the encoded bitstreams for each block and information regarding the shallow tree structure to form the combined encoded bit stream.

In general, at least one example of an embodiment can involve a method comprising: compressing data representing a point cloud; and providing a combined encoded bitstream including the compressed data, wherein compressing the data comprises converting raw point cloud geometry data included in the data representing the point cloud into blocks of data based on a shallow tree structure; shifting an origin for each block of data to shift original coordinates of data in each block to local block coordinates; converting each block into a separate tree structure;
initialize a context for all nodes in each block; compressing the data of each block by, for each node of the tree of a block, starting from a root node of the tree structure: predict an occupancy symbol distribution for a current node in the tree using a learning-based entropy model based on context information from the current node and feature information from one or more neighboring nodes and from one or more ancestor nodes of the current node; encode an occupancy symbol for the current node into an encoded bitstream representing the current node using an adaptive entropy encoder based on the predicted occupancy distribution; combine the encoded bitstreams representing each node of the tree of the block to form an encoded bitstream for the block representing the tree structure of the block combine the encoded bitstreams for each block and information regarding the shallow tree structure to form the encoded combined bit stream.

In general, at least one example of an embodiment can involve a method or apparatus involving a tree representation of point cloud information, wherein the tree representation comprises one of an octree or a kd-tree or a quad tree-binary tree (QTBT) or a prediction tree.

In general, at least one example of an embodiment can involve apparatus involving at least one processor processing a tree representation of point cloud information as described herein, wherein the at least one processor can be configured to predict an occupancy symbol distribution for all nodes in the tree in serial or parallel.

In general, at least one example of an embodiment can involve a method of processing point cloud information based on a tree representation, wherein the method can comprise predicting the occupancy symbol distribution for all nodes in the tree in serial or parallel.

In general, at least one example of an embodiment can involve apparatus or a method as described herein, wherein a learning-based entropy model uses one or more deep features of one or more sibling nodes of an ancestor or parent node through the same learning-based model used for siblings of the current node, to predict the occupancy symbol distributions.

In general, at least one example of an embodiment can involve apparatus or a method as described herein, wherein a learning-based entropy model uses one or more deep features of all nodes at an ancestor or parent level through the same learning-based model used for siblings of the current node, to predict the occupancy symbol distributions.

In general, at least one example of an embodiment can involve apparatus or a method as described herein, wherein a learning-based entropy model uses one or more deep features of all nodes at an ancestor or parent level through a separate learning-based model, to predict the occupancy symbol distributions.

In general, at least one example of an embodiment can involve apparatus or a method as described herein providing for encoding and/or decoding point cloud information represented as a tree structure based on predicting an occupancy symbol distribution for a current node using a learning-based entropy model, wherein the learning-based model uses deep features of all nodes at an ancestor or parent level k associated with the current node for all layers deeper than k+1 through either the same learning-based model as that used for siblings of the current node or a separate or different learning-based model as that used for siblings of the current node.

In general, at least one example of an embodiment can involve apparatus or a method as described herein, wherein a context associated with a node of the a structure comprises an occupancy of an ancestor or parent node, a depth or level within the tree structure of the associated node, the octant of the associated node, and the spatial position of the associated node.

In general, another example of an embodiment can involve a bitstream or signal formatted to include compressed point cloud information, wherein the point cloud information is encoded by processing based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving a bitstream or signal generated according to methods or apparatus described herein.

A variety of examples of embodiments, including tools, features, models, approaches, etc., are described herein. Many of these examples are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects.

In general, the examples of embodiments described and contemplated herein can be implemented in many different forms. FIG. 11 described above provides an example of an embodiment, but other embodiments are contemplated and the discussion of FIG. 11 does not limit the breadth of the possible embodiments or implementations.

At least one aspect of one or more examples of embodiments described herein generally relates to point cloud compression or encoding and decompression or decoding, and at least one other aspect generally relates to transmitting a bitstream generated or encoded. These and other aspects can be implemented in various embodiments such as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application such as the number of layers or depth of MLPs or the dimension of hidden features. The specific values are for example purposes and the aspects described are not limited to these specific values.

Various implementations involve decoding. "Decoding", as used in this application, can encompass all or part of the processes performed, for example, on a received encoded sequence in order to produce a final output, e.g., suitable for display. In various embodiments, such processes include one or more of the processes typically performed by a decoder, for example, entropy decoding, inverse quantization, inverse transformation, etc. In various embodiments, such processes also, or alternatively, include processes performed by a decoder of various implementations described in this application.

As further examples, in one embodiment "decoding" refers only to entropy decoding, in another embodiment "decoding" can refer to a different form of decoding, and in another embodiment "decoding" can refer to a combination of entropy decoding and a different form of decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, transformation, quantization, entropy encoding, etc.

As further examples, in one embodiment "encoding" refers only to entropy encoding, in another embodiment "encoding" can refer a different form of encoding, and in another embodiment "encoding" can refer to a combination of entropy encoding and a different form of encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

In general, the examples of embodiments, implementations, features, etc., described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. One or more examples of methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users. Also, use of the term "processor" herein is intended to broadly encompass various configurations of one processor or more than one processor.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments are described herein. Features of these embodiments can be provided alone or in any combination, across various claim categories and types. Further, embodiments can include one or more of the following features, devices, or aspects, alone or in any combination, across various claim categories and types:

providing for encoding and/or decoding point cloud information represented as a tree structure based on predicting an occupancy symbol distribution for a current node using a learning-based entropy model which uses context information from the current node and feature information from available neighboring nodes and one or more ancestor nodes;

providing for encoding and/or decoding point cloud information represented as a tree structure based on predicting an occupancy symbol distribution for a current node using a learning-based entropy model which uses deep features of sibling nodes of an ancestor or parent node of the current node through the same learning-based model used for siblings of the current node;

providing for encoding and/or decoding point cloud information represented as a tree structure based on predicting an occupancy symbol distribution for a current node using a learning-based entropy model which uses deep features of all nodes at an ancestor or parent level associated with the current node;

providing for encoding and/or decoding point cloud information represented as a tree structure based on predicting an occupancy symbol distribution for a current node using a learning-based entropy model which uses deep features of all nodes at an ancestor or parent level associated with the current node through the same learning-based model used for siblings of the current node;

providing for encoding and/or decoding point cloud information represented as a tree structure based on predicting an occupancy symbol distribution for a current node using a learning-based entropy model which uses deep features of all nodes at an ancestor or parent level associated with the current node through a separate or different learning-based model than that used for siblings of the current node;

providing for encoding and/or decoding point cloud information represented as a tree structure based on predicting an occupancy symbol distribution for a current node using a learning-based entropy model which uses deep features of all nodes at an ancestor or parent level k associated with the current node for all layers deeper than k+1 through either the same learning-based model as that used for siblings of the current node or a separate or different learning-based model as that used for siblings of the current node;

providing for encoding and/or decoding point cloud information represented as a block-based tree structure partitioned into blocks based on a shallow partitioning and a bitstream encoded or decoded comprises a combined bitstream including a partitioning bitstream indicating the shallow partitioning and a block bitstream representing point cloud information in each block;

providing for encoding and/or decoding point cloud information involving a tree representation of the point cloud information, wherein the tree representation comprises one of an octree or a kd-tree or a quad tree-binary tree (QTBT) or a prediction tree;

providing for encoding and/or decoding point cloud information represented as a tree structure based on predicting an occupancy symbol distribution for all nodes in the tree in serial or parallel;

providing for inserting in a signal or bitstream syntax elements that enable a decoder to operate in a manner corresponding to that used by an encoder;

providing for inserting in a signal or bitstream syntax elements that enable an encoder and/or decoder to provide encoding and/or decoding in accordance with any of the embodiments, features or entities, alone or in any combination, as described herein.

providing for selecting, based on these syntax elements, the features or entities, alone or in any combination, as described herein to apply at the decoder;

providing for creating and/or transmitting and/or receiving and/or decoding a bitstream or signal that includes one or more of the described syntax elements, or variations thereof;

providing for creating and/or transmitting and/or receiving and/or decoding a bitstream according to any of the embodiments described;

a method, process, apparatus, medium storing instructions, medium storing data, or signal according to any of the embodiments described;

a TV, set-top box, cell phone, tablet, or other electronic device that provides for applying encoding and/or decoding according to any of the embodiments, features or entities, alone or in any combination, as described herein;

a TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image;

a TV, set-top box, cell phone, tablet, or other electronic device that tunes (e.g. using a tuner) a channel to receive a signal including point cloud information, and performs encoding and/or decoding according to any of the embodiments, features or entities, alone or in any combination, as described herein;

a TV, set-top box, cell phone, tablet, or other electronic device that receives (e.g. using an antenna) a signal over the air that includes point cloud information, and performs encoding and/or decoding according to any of the embodiments, features or entities, alone or in any combination, as described herein;

a computer program product storing program code that, when executed by a computer encoding and/or decoding in accordance with any of the embodiments, features or entities, alone or in any combination, as described herein.

a non-transitory computer readable medium including executable program instructions causing a computer executing the instructions to implement encoding and/or decoding in accordance with any of the embodiments, features or entities, alone or in any combination, as described herein.

The invention claimed is:

1. An apparatus comprising a processor configured to receive a bitstream including a compressed point cloud represented as a tree structure; and to decode the bitstream by, starting from a root node of the tree structure as a current node:
   constructing a context for the current node comprising at least one of a level, an octant, a location, or a parent of the current node;
   predict an occupancy symbol distribution that indicates child nodes occupancy probabilities for the current node by using a learning-based entropy model based on the context for the current node and feature information from one or more available neighboring nodes and from one or more ancestor nodes of the current node; and
   decode an occupancy symbol for the current node using an adaptive entropy decoder based on the occupancy symbol distribution;
   expanding the tree structure based on the decoded occupancy symbol; and
   output the expanded tree structure representative of a reconstruction of the compressed point cloud.

2. The apparatus of claim 1, wherein the tree structure is an octree, a kd-tree, a quad tree-binary tree, or a prediction tree.

3. The apparatus of claim 1, wherein the processor is configured to predict occupancy symbol distributions for each node of the tree structure in parallel.

4. The apparatus of claim 1, wherein the learning-based entropy model uses one or more deep features of one or more sibling nodes of the one or more ancestor nodes through the same learning-based model used for siblings of the current node, to predict the occupancy symbol distributions.

5. The apparatus of claim 1, wherein the learning-based entropy model uses one or more deep features of all nodes at one or more ancestor levels through the same learning-based model used for siblings of the current node, to predict the occupancy symbol distributions.

6. A method comprising:
   receiving an encoded bitstream including a compressed point cloud represented as a tree structure; and
   decoding the encoded bitstream by, starting from a root node of the tree structure as a current node:
   constructing a context for the current node comprising at least one of a level, an octant, a location, or a parent of the current node;
   predicting an occupancy symbol distribution that indicates child nodes occupancy probabilities for the current node by using a learning-based entropy model and based on the context for the current node and feature information from one or more available neighboring nodes and from one or more ancestor nodes of the current node;
   decoding an occupancy symbol for the current node using an adaptive entropy decoder based on the occupancy symbol distribution;
   expanding the tree structure based on the decoded occupancy symbol; and
   outputting the expanded tree structure representative of a reconstruction of the compressed point cloud.

7. The method of claim 6, wherein predicting the occupancy symbol distributions for each node of the tree structure is performed in parallel.

8. The method of claim 6, wherein the learning-based model uses one or more deep features of all nodes at a parent level k associated with the current node for all layers deeper than k+1.

9. The method of claim 6, wherein the tree structure is an octree, a kd-tree, a quad tree-binary tree, or a prediction tree.

10. The method of claim 6, wherein the learning-based entropy model uses one or more deep features of one or more sibling nodes of the one or more ancestor nodes through the same learning-based model used for siblings of the current node, to predict the occupancy symbol distributions.

11. The method of claim 6, wherein the learning-based entropy model uses one or more deep features of all nodes at one or more ancestor levels through the same learning-based model used for siblings of the current node, to predict the occupancy symbol distributions.

12. An apparatus for compressing a point cloud represented as a tree structure; the apparatus comprising a processor configured to construct a context for each node of the tree structure comprising at least one of a level, an octant, a location, or a parent of the current node, by, starting from a root node of the tree structure as a current node:
predicting an occupancy symbol distribution that indicates child nodes occupancy probabilities for the current node by using a learning based entropy model based on the context for the current node and feature information from one or more neighboring nodes and from one or more ancestor nodes of the current node;
encoding an occupancy symbol for the current node into one of a plurality of bitstreams representative of the current node by using an adaptive entropy encoder based on the predicted occupancy symbol distribution; and
combine the plurality of bitstreams.

13. The apparatus of claim 12, wherein the tree structure is an octree, a kd-tree, a quad tree-binary tree, or a prediction tree.

14. The apparatus of claim 12, wherein the processor is configured to predict occupancy symbol distributions for each node of the tree structure in parallel.

15. The apparatus of claim 12, wherein the learning-based entropy model uses one or more deep features of one or more sibling nodes of the one or more ancestor nodes through the same learning-based model used for siblings of the current node, to predict the occupancy symbol distributions.

16. A method for compressing a point cloud represented as a tree structure, the method comprising:
constructing a context for each node of the tree structure comprising at least one of a level, an octant, a location, or a parent of the current node, by, starting from a root node of the tree structure as a current node:
predicting an occupancy symbol distribution that indicates child nodes occupancy probabilities for the current node by using a learning based entropy model based on the context for the current node and feature information from one or more neighboring nodes and from one or more ancestor nodes of the current node;
encoding an occupancy symbol for the current node into one of a plurality of bitstreams representative of the current node by using an adaptive entropy encoder based on the predicted occupancy symbol distribution; and
combining the plurality of bitstreams.

17. The method of claim 16, wherein predicting the occupancy symbol distributions for each node of the tree structure is performed in parallel.

18. The method of claim 16, wherein the learning-based model uses one or more deep features of all nodes at a parent level k associated with the current node for all layers deeper than k+1.

19. The method of claim 16, wherein the tree structure is an octree, a kd-tree, a quad tree-binary tree, or a prediction tree.

20. The method of claim 16, wherein the learning-based entropy model uses one or more deep features of one or more sibling nodes of the one or more ancestor nodes through the same learning-based model used for siblings of the current node, to predict the occupancy symbol distributions.

* * * * *